United States Patent
Fukunaga et al.

(10) Patent No.: US 11,754,226 B2
(45) Date of Patent: Sep. 12, 2023

(54) HYDROGEN FUEL FILLING SYSTEM AND HYDROGEN FUEL FILLING METHOD

(71) Applicant: ENEOS Corporation, Tokyo (JP)

(72) Inventors: Akihiko Fukunaga, Tokyo (JP); Toshio Tezuka, Tokyo (JP); Tatsuya Rembutsu, Shizuoka (JP); Kouki Sakamoto, Shizuoka (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 17/017,132

(22) Filed: Sep. 10, 2020

(65) Prior Publication Data
US 2021/0003256 A1 Jan. 7, 2021

Related U.S. Application Data

(63) Continuation of application No. PCT/JP2019/009917, filed on Mar. 12, 2019.

(30) Foreign Application Priority Data

Mar. 16, 2018 (JP) ................. 2018-050037

(51) Int. Cl.
*F17C 5/06* (2006.01)
*B67D 7/04* (2010.01)

(52) U.S. Cl.
CPC ............ *F17C 5/06* (2013.01); *B67D 7/04* (2013.01); *F17C 2221/012* (2013.01);
(Continued)

(58) Field of Classification Search
CPC ............ F17C 5/06; F17C 2221/012; F17C 2223/0123; F17C 2227/0157;
(Continued)

(56) References Cited

U.S. PATENT DOCUMENTS 9,435,488 B2 * 9/2016 Nagura ............... F17C 5/007
9,442,495 B2 * 9/2016 Van Doorn ....... H01M 8/04776
(Continued)

FOREIGN PATENT DOCUMENTS

CN 1312195 9/2001
CN 101802480 8/2010
(Continued)

OTHER PUBLICATIONS

WO-2011016091-A1 English Translation of Specification (Year: 2021).*
(Continued)

*Primary Examiner* — Timothy P. Kelly
*Assistant Examiner* — Stephanie A Shrieves
(74) *Attorney, Agent, or Firm* — GREENBLUM & BERNSTEIN, P.L.C.

(57) ABSTRACT

According to one aspect of the present invention, a hydrogen fuel filling system includes a first flow passage through which hydrogen fuel supplied from a pressure accumulator that accumulates hydrogen fuel under pressure passes; a second flow passage through which hydrogen fuel supplied from the pressure accumulator passes, and which is arranged in parallel with the first flow passage; a switching valve that switches flow passages selectively from one of the first and second flow passages to another, or that switches flow passages between one and both of the first and second flow passages; and a control circuit that controls opening/closing of the switching valve, wherein a fuel cell vehicle using hydrogen fuel as a power source is filled with hydrogen fuel while switching the flow passages by the switching valve during supply from the pressure accumulator.

7 Claims, 11 Drawing Sheets

(52) U.S. Cl.
CPC ............ *F17C 2223/0123* (2013.01); *F17C 2227/0157* (2013.01); *F17C 2250/032* (2013.01); *F17C 2250/0443* (2013.01); *F17C 2265/065* (2013.01)

(58) Field of Classification Search
CPC ........ F17C 2250/032; F17C 2250/0443; F17C 2265/065; F17C 5/007; F17C 2205/0326; F17C 2205/0332; F17C 2205/0338; F17C 2205/0341; F17C 2205/035; F17C 2223/036; F17C 2225/0123; F17C 2225/036; F17C 2227/0337; F17C 2227/0388; F17C 2227/043; F17C 2250/034; F17C 2250/043; F17C 2250/0434; F17C 2250/0439; F17C 2250/0495; F17C 2250/0636; F17C 2250/0649; F17C 2250/075; F17C 2260/02; F17C 2265/063; F17C 2270/0139; B67D 7/04; Y02E 60/32
USPC .............................................................. 141/2
See application file for complete search history.

(56) References Cited

U.S. PATENT DOCUMENTS

| | | | | |
|---|---|---|---|---|
| 11,204,133 | B2* | 12/2021 | Kawase | F17C 13/026 |
| 2001/0010239 | A1 | 8/2001 | Mutter | |
| 2010/0294393 | A1* | 11/2010 | Allidieres | F17C 13/025 |
| | | | | 141/1 |
| 2012/0298256 | A1* | 11/2012 | Mori | F17C 5/007 |
| | | | | 141/94 |
| 2013/0037165 | A1* | 2/2013 | Okawachi | F17C 5/06 |
| | | | | 141/4 |
| 2014/0261863 | A1* | 9/2014 | Cohen | F17C 5/06 |
| | | | | 141/4 |
| 2014/0272671 | A1* | 9/2014 | Handa | B60L 3/0053 |
| | | | | 429/515 |
| 2014/0290790 | A1* | 10/2014 | Mathison | F17C 5/007 |
| | | | | 141/94 |
| 2015/0167895 | A1 | 6/2015 | Nagura et al. | |
| 2015/0377416 | A1* | 12/2015 | Miyoshi | G05D 7/0635 |
| | | | | 141/95 |
| 2020/0173607 | A1* | 6/2020 | Mathison | F17C 13/026 |

FOREIGN PATENT DOCUMENTS

| | | | |
|---|---|---|---|
| CN | 104712901 | | 6/2015 |
| CN | 107270270 A | | 10/2017 |
| JP | 8-284765 A | | 10/1996 |
| JP | 2007-92927 | | 4/2007 |
| JP | 2007092927 A | * | 4/2007 |
| JP | 2010-144771 | | 7/2010 |
| JP | 2010-144771 A | | 7/2010 |
| JP | 2011-64328 A | | 3/2011 |
| JP | 2011-112213 A | | 6/2011 |
| JP | 2011-157995 A | | 8/2011 |
| JP | 2011-231799 A | | 11/2011 |
| JP | 2014-142003 A | | 8/2014 |
| JP | 2015-197700 A | | 11/2015 |
| JP | 2016-161071 | | 9/2016 |
| JP | 2017-180747 A | | 10/2017 |
| JP | 2017-180800 | | 10/2017 |
| JP | 2017-187124 A | | 10/2017 |
| JP | 2017180747 A | * | 10/2017 |
| JP | 2017180800 A | * | 10/2017 |
| JP | 2017187124 A | * | 10/2017 |
| WO | 2011/016091 A | | 2/2011 |
| WO | WO-2011016091 A1 | * | 2/2011 ............... F17C 5/06 |

OTHER PUBLICATIONS

JP-2017187124-A English Translation of Specification (Year: 2022).*
JP-2017180747-A English Translation of Specification (Year: 2022).*
JP-2017180800-A English Translation of Specification (Year: 2022).*
JP-2007092927-A English Translation of Specification (Year: 2022).*
WO-2011016091-A1 English Translation of Specification (Year: 2022).*
Extended European Search Report issued in EP Application No. 19 76 8328, dated Nov. 10, 2021.
Japanese Office Action issued in JP Application No. 2018-050037, dated Nov. 16, 2021.
English language translation of Chinese Office Action issued in Application No. 201980019858.3, dated Jul. 16, 2021.
International Search Report issued in International Patent Application No. PCT/JP2019/009917, dated Jun. 4, 2019, along with an English translation thereof.
Written Opinion issued in International Patent Application No. PCT/JP2019/009917, dated Jun. 4, 2019, along with an English translation thereof.
Australian Office Action issued in Application No. 2019234804, dated Jun. 4, 2021.
Chinese Office Action issued in Application No. 201980019858.3, dated Jul. 16, 2021.
Chinese Office Action issued in CN Application No. 201980019858.3, dated Mar. 7, 2022, and English language translation thereof.
Japanese Office Action issued in JP Application No. 2018-050037, dated Mar. 15, 2022, and English language translation thereof.
Computer generated English language translation of Chinese Office Action issued in CN Application No. 201980019858.3, dated Mar. 7, 2022.
China Office Action issued in CN Application No. 201980019858.3, dated Sep. 5, 2022.
Japanese Office Action issued in JP Application No. 2018-050037, dated Jul. 12, 2022.
Office Action issued in Chinese Patent Application No. 2980019858. 3, dated Mar. 30, 2023.

* cited by examiner

HYDROGEN FUEL FILLING SYSTEM AND HYDROGEN FUEL FILLING METHOD

CROSS-REFERENCE TO RELATED APPLICATION

This application is a continuation application based upon and claims the benefit of priority from prior Japanese Patent Application No. 2018-050037 (application number) filed on Mar. 16, 2018 in Japan, and International Application PCT/JP2019/009917, the International Filing Date of which is Mar. 12, 2019. The contents described in JP2018-050037 and PCT/JP2019/009917 are incorporated in the present application.

BACKGROUND OF THE INVENTION

Field of the Invention

The present invention relates to a hydrogen fuel filling system and a hydrogen fuel filling method, and for example, a filling system and a method for filling a general vehicle using hydrogen gas as fuel with hydrogen gas in a hydrogen station.

Description of Related Art

In recent years, hydrogen fuel has attracted attention as a clean energy source in addition to conventional fuel oils such as gasoline as fuel for automobiles. Along with this, development of a fuel cell vehicle (FCV) using hydrogen fuel as a power source is under way. In order to popularize such a fuel cell vehicle (FCV), it is necessary to spread hydrogen stations that can rapidly fill a FCV with hydrogen fuel. In a hydrogen station, in order to rapidly fill a FCV with hydrogen fuel (hydrogen gas), a multi-stage pressure accumulator including a plurality of pressure accumulators for accumulating hydrogen fuel compressed to a high pressure by the compressor is installed. Then, hydrogen fuel is rapidly charged from the pressure accumulator to the fuel tank by the differential pressure between the pressure in the pressure accumulator and the pressure in the fuel tank of the FCV while keeping the differential pressure large by switching the pressure accumulators to be used (see, for example, JP-A-2015-197700).

Here, various valves are provided in the dispenser housing that fills the FCV with hydrogen fuel supplied from the multi-stage pressure accumulator. Out of these valves, unlike other ON/OFF valves, a flow rate adjusting valve is often used at an intermediate opening for adjusting the flow rate of fuel gas. Thus, leakage from the shaft seal portion occurs due to deterioration over time. Use or development of a highly accurate flow rate adjusting valve that does not easily cause such a leakage is costly. Therefore, inexpensive and safe hydrogen fuel filling is demanded.

Here, when supplying fuel gas to a large vehicle, there is disclosed a method of using a bypass path in addition to the path through which the fuel gas is supplied to an ordinary vehicle in order to shorten the filling time (see, for example, JP-A-2011-064328). However, even with this method, the opening of the flow control valve is adjusted, and thus it is not possible to prevent the occurrence of leakage due to the above-described deterioration of the flow control valve over time.

BRIEF SUMMARY OF THE INVENTION

According to one aspect of the present invention, a hydrogen fuel filling system includes:

a first flow passage through which hydrogen fuel supplied from a pressure accumulator that accumulates hydrogen fuel under pressure passes;

a second flow passage through which hydrogen fuel supplied from the pressure accumulator passes, and which is arranged in parallel with the first flow passage;

a switching valve that switches flow passages selectively from one of the first and second flow passages to another, or that switches flow passages between one and both of the first and second flow passages; and a control circuit that controls opening/closing of the switching valve, wherein a fuel cell vehicle using hydrogen fuel as a power source is filled with hydrogen fuel while switching the flow passages by the switching valve during supply from the pressure accumulator.

According to another aspect of the present invention, a hydrogen fuel filling system includes:

a first flow passage through which hydrogen fuel supplied from each pressure accumulator, to which switching is made between a plurality of pressure accumulators accumulating hydrogen fuel under pressure, passes;

a second flow passage through which hydrogen fuel supplied from the each pressure accumulator, to which the switching is made, passes, the second flow passage being arranged in parallel with the first flow passage;

a switching valve that switches flow passages selectively from one of the first and second flow passages to another, or that switches flow passages between one and both of the first and second flow passages; and a control circuit that controls opening/closing of the switching valve, wherein a fuel cell vehicle (FCV) using hydrogen fuel as a power source is filled with hydrogen fuel while adjusting, every time when switching between the plurality of pressure accumulators is made, a flow rate per unit time of hydrogen fuel by switching between the flow passages by the switching valve during supply of hydrogen fuel from the pressure accumulator to which switching has been made.

According to further another aspect of the present invention, a hydrogen fuel filling method includes:

filling a fuel cell vehicle that uses hydrogen fuel as a power source with hydrogen fuel supplied from a pressure accumulator that accumulates hydrogen fuel under pressure through a first flow passage;

switching flow passages of the hydrogen fuel from the first flow passage to a second flow passage arranged in parallel with the first flow passage, or switching the flow passages of the hydrogen fuel from the first flow passage to both of the first and second flow passages during supply from the pressure accumulator; and filling the FCV with hydrogen fuel from the pressure accumulator through a flow passage to which switching has been made.

According to further another aspect of the present invention, a hydrogen fuel filling method includes:

filling a fuel cell vehicle that uses hydrogen fuel as a power source with hydrogen fuel while adjusting a flow rate per unit time of hydrogen fuel supplied from a first pressure accumulator of a plurality of pressure accumulators, which accumulate hydrogen fuel under pressure, by switching flow passages of hydrogen fuel supplied from the first pressure accumulator selectively from one to another of a first flow passage and a second flow passage arranged in parallel with the first flow passage, or from one to both of the first and second flow passages during supply; and filling, subsequently to the filling the fuel cell vehicle with hydrogen fuel supplied from the first pressure accumulator, the fuel cell vehicle with hydrogen fuel supplied from a second pressure accumulator of the plurality of pressure accumulators, to which switching has been made from the first pressure accumulator, while adjusting a flow rate per unit time of hydrogen fuel supplied from the second pressure accumulator by switching flow passages of hydrogen fuel supplied from the second pressure accumulator selectively from one to another of the first flow passage to the second flow passage, or one to both of the first and second flow passages during supply.

DESCRIPTION OF EMBODIMENTS

Embodiments below describe about a system and a method capable of hydrogen fuel filling while adjusting the flow rate of supplied hydrogen fuel without using a flow rate adjusting valve.

First Embodiment

Figure 1:
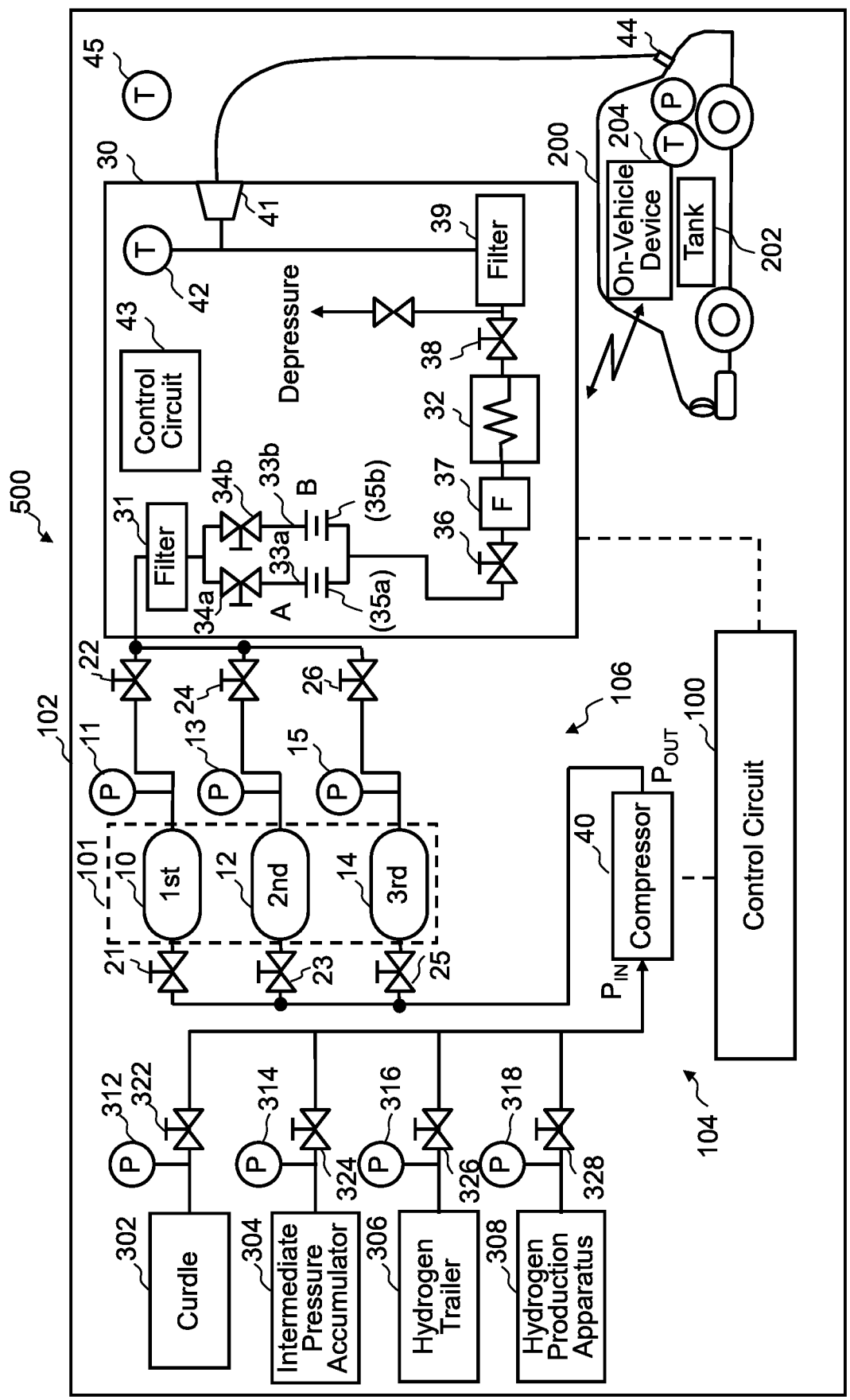
FIG. 1 is an example of a configuration diagram illustrating a configuration of a hydrogen fuel supply system for a hydrogen station according to a first embodiment.

FIG. 1 is an example of a configuration diagram illustrating a configuration of a hydrogen fuel supply system for a hydrogen station according to a first embodiment.

In FIG. 1, a hydrogen fuel supply system 500 is provided in a hydrogen station 102. The hydrogen fuel supply system 500 includes a multi-stage pressure accumulator 101, a dispenser 30, a compressor 40, and a control circuit 100. The multi-stage pressure accumulator 101 includes a plurality of pressure accumulators 10, 12 and 14 having different minimum operating pressures to provide multi stage. In the example of FIG. 1, three pressure accumulators 10, 12, and 14 constitute the multi-stage pressure accumulator 101. In the example of FIG. 1, the pressure accumulator 10 acts as a 1st bank having a low minimum operating pressure. The pressure accumulator 12 acts as a 2nd bank having an intermediate minimum operating pressure. The pressure accumulator 14 acts as a 3rd bank having a high minimum operating pressure.

In the hydrogen station 102, a curdle 302, an intermediate pressure accumulator 304, and/or a hydrogen production apparatus 308 are additionally provided. In addition, a hydrogen trailer 306 filled with hydrogen gas for delivery comes into the hydrogen station 102.

In FIG. 1, in the dispenser 30 (an example of a filling system), a filter 31, a flow passage 33a (first flow passage), a flow passage 33b (second flow passage), valves 34a and 34b, a shutoff valve 36, a flowmeter 37, a cooler 32 (pre-cooler), a shutoff valve 38, a filter 39, an emergency release coupler 41, a thermometer 42, and a control circuit 43 are provided, and in the dispenser 30, a nozzle 44 extending outside the dispenser 30 is further provided. The dispenser 30 removes impurities of hydrogen fuel (hydrogen gas) supplied from the multi-stage pressure accumulator 101 with the filter 31, passes hydrogen fuel through one or both of the flow passages 33a and 33b, and delivers hydrogen fuel to the cooler 32 through the shutoff valve 36 and the flowmeter 37. At that time, the flow rate per unit time of hydrogen fuel supplied from the multi-stage pressure accumulator 101 is measured by the flowmeter 37. The hydrogen fuel is then cooled to, for example, −40° C. by the cooler 32. With the cooled hydrogen fuel, a fuel tank 202 mounted on an FCV 200 is filled through the shutoff valve 38, the filter 39, the emergency release coupler 41, and the nozzle 44 using the differential pressure. At that time, the temperature of hydrogen fuel supplied from the dispenser 30 is measured by the thermometer 42 provided near the outlet of the dispenser 30. The control circuit 43 in the dispenser 30 controls opening/closing of the valves 34a and 34b, the shutoff valves 36 and 38, and a depressurizing valve. In addition, the control circuit 43 is connected with the flowmeter 37, the thermometer 42, and a thermometer 45 for measuring the outside air temperature. Furthermore, the control circuit 43 is configured to be able to communicate with an on-vehicle device 204 in the FCV 200 (fuel cell vehicle (FCV) using hydrogen fuel as a power source) that has come into the hydrogen station 102. For example, the control circuit 43 is configured to be able to communicate wirelessly using infrared rays. In addition, the control circuit 43 is connected to the control circuit 100 that controls the entire hydrogen fuel supply system 500.

In FIG. 1, the suction side of the compressor 40 is connected to the curdle 302 via a valve 322 by a pipe. Similarly, the suction side of the compressor 40 is connected to the intermediate pressure accumulator 304 via a valve 324 by a pipe. Similarly, the suction side of the compressor 40 is connected to the filling tank of the hydrogen trailer 306 via a valve 326 by a pipe. Similarly, the suction side of the compressor 40 is connected to the discharge side of the hydrogen production apparatus 308 via a valve 328 by a pipe.

The discharge side of the compressor 40 is connected to the pressure accumulator 10 via a valve 21 by a pipe. Similarly, the discharge side of the compressor 40 is connected to the pressure accumulator 12 via a valve 23 by a pipe. Similarly, the discharge side of the compressor 40 is connected to the pressure accumulator 14 via a valve 25 by a pipe.

In addition, the pressure accumulator 10 is connected to the dispenser 30 via a valve 22 by a pipe. Further, the pressure accumulator 12 is connected to the dispenser 30 via a valve 24 by a pipe. In addition, the pressure accumulator 14 is connected to the dispenser 30 via a valve 26 by a pipe. In this way, the dispenser 30 is commonly connected to the pressure accumulators 10, 12, and 14 included in the multi-stage pressure accumulator 101.

The pressure in the curdle 302 is measured by a pressure gauge 312. The pressure in the intermediate pressure accumulator 304 is measured by a pressure gauge 314. The pressure in the filling tank of the hydrogen trailer 306 is measured by a pressure gauge 316. The discharge pressure of the hydrogen production apparatus 308 is measured by a pressure gauge 318.

The pressure in the pressure accumulator 10 is measured by a pressure gauge 11. The pressure in the pressure accumulator 12 is measured by a pressure gauge 13. The pressure in the pressure accumulator 14 is measured by a pressure gauge 15.

The hydrogen fuel accumulated under pressure in the tank of the curdle 302, the intermediate pressure accumulator 304, or the hydrogen trailer 306 is depressurized to a low pressure (for example, 0.6 MPa) by respective regulators (not illustrated) controlled by the control circuit 100, and supplied to the suction side of the compressor 40. Similarly, hydrogen fuel produced by the hydrogen production apparatus 308 is supplied to the suction side of the compressor 40 at a low pressure (for example, 0.6 MPa). The compressor 40, under control by the control circuit 100, supplies hydrogen fuel supplied from the curdle 302, the intermediate pressure accumulator 304, the hydrogen trailer 306, or the hydrogen production apparatus 308 at a low pressure to each of the pressure accumulators 10, 12, and 14 of the multi-stage pressure accumulator 101 while compressing the hydrogen fuel. The compressor 40 compresses the hydrogen fuel until each of the pressure accumulators 10, 12, and 14 of the multi-stage pressure accumulator 101 reaches a predetermined high pressure (for example, 82 MPa). In other words, the compressor 40 compresses the hydrogen fuel until the secondary side pressure $P_{OUT}$ on the discharge side reaches a predetermined high pressure (for example, 82 MPa). Which of the curdle 302, the intermediate pressure accumulator 304, the hydrogen trailer 306, and the hydrogen production apparatus 308 supplies hydrogen fuel to the suction side of the compressor 40 can be determined by the control circuit 100 controlling opening/closing of the corresponding valves 322, 324, 326, and 328 arranged on the respective pipes. Similarly, to which of the pressure accumulators 10, 12, and 14 the compressor 40 supplies hydrogen fuel can be determined by the control circuit 100 controlling opening/closing of the corresponding valves 21, 23, and 25 arranged on the respective pipes. Alternatively, the control may be performed such that hydrogen fuel is supplied to two or more pressure accumulators at the same time.

In the example described above, pressure reduction control is performed on hydrogen fuel such that the pressure $P_{IN}$ of the hydrogen fuel supplied to the suction side of the compressor 40 is reduced to a predetermined low pressure (for example, 0.6 MPa), but the invention is not limited to this configuration. A configuration for supplying, to the suction side of the compressor 40, hydrogen fuel accumulated under pressure in the curdle 302, the intermediate pressure accumulator 304, or the hydrogen trailer 306 without reducing the pressure of the hydrogen fuel or at a pressure higher than the predetermined low pressure (for example, 0.6 MPa) and then the hydrogen fuel is compressed is possible.

The hydrogen fuel accumulated under pressure in the multi-stage pressure accumulator 101 is cooled by the cooler 32 in the dispenser 30 and is supplied from the dispenser 30 to the FCV 200 that has come into the hydrogen station 102.

Figure 2:
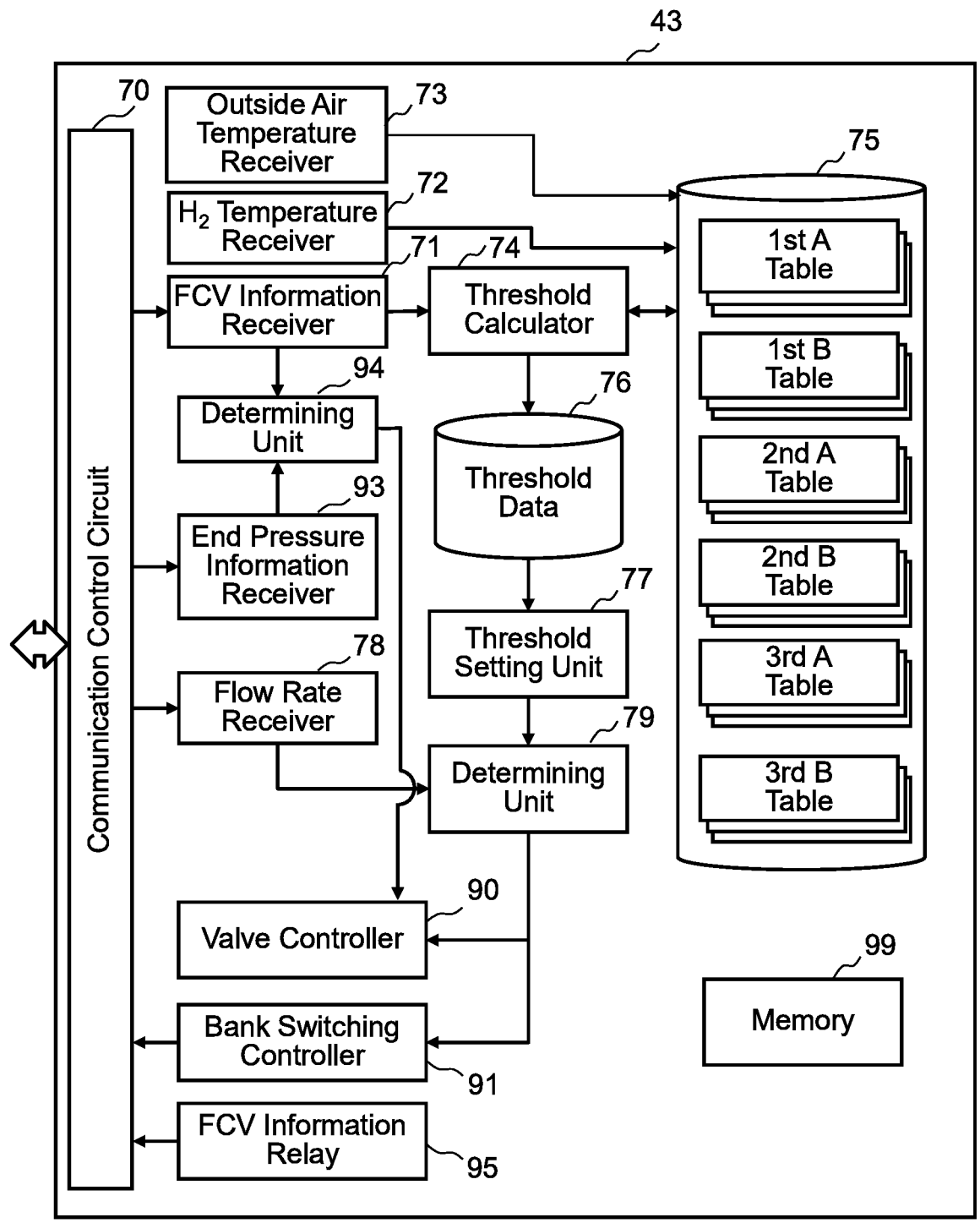
FIG. 2 is a configuration diagram illustrating an example of an internal configuration of control circuit in a dispenser according to the first embodiment.

FIG. 2 is a configuration diagram illustrating an example of the internal configuration of the control circuit in the dispenser according to the first embodiment. In FIG. 2, in the control circuit 43 in the dispenser 30, a communication control circuit 70, a memory 99, an FCV information receiver 71, a hydrogen temperature receiver 72, an outside air temperature receiver 73, a threshold calculator 74, a threshold setting unit 77, a flow rate receiver 78, determining unit 79, valve controller 90, bank switching controller 91, end pressure information receiver 93, determining unit 94, FCV information relay 95, and storage devices 75 and 76 such as magnetic disk devices are provided. Each of the components such as the FCV information receiver 71, the hydrogen temperature receiver 72, the outside air temperature receiver 73, the threshold calculator 74, the threshold setting unit 77, the flow rate receiver 78, the determining unit 79, the valve controller 90, the bank switching controller 91, the end pressure information receiver 93, the determining unit 94, and the FCV information relay 95 includes a processing circuit, and the processing circuit includes an electric circuit, a computer, a processor, a circuit board, a semiconductor device or the like. Moreover, the components may use a common processing circuit (the same processing circuit). Alternatively, the components may use different processing circuits (separate processing circuits). Input data required and the result of calculation in the FCV information receiver 71, the hydrogen temperature receiver 72, the outside air temperature receiver 73, the threshold calculator 74, the threshold setting unit 77, the flow rate receiver 78, the determining unit 79, the valve controller 90, the bank switching controller 91, the end pressure information receiver 93, the determining unit 94, and the FCV information relay 95 are stored in the memory 99 each time.

Figure 3:
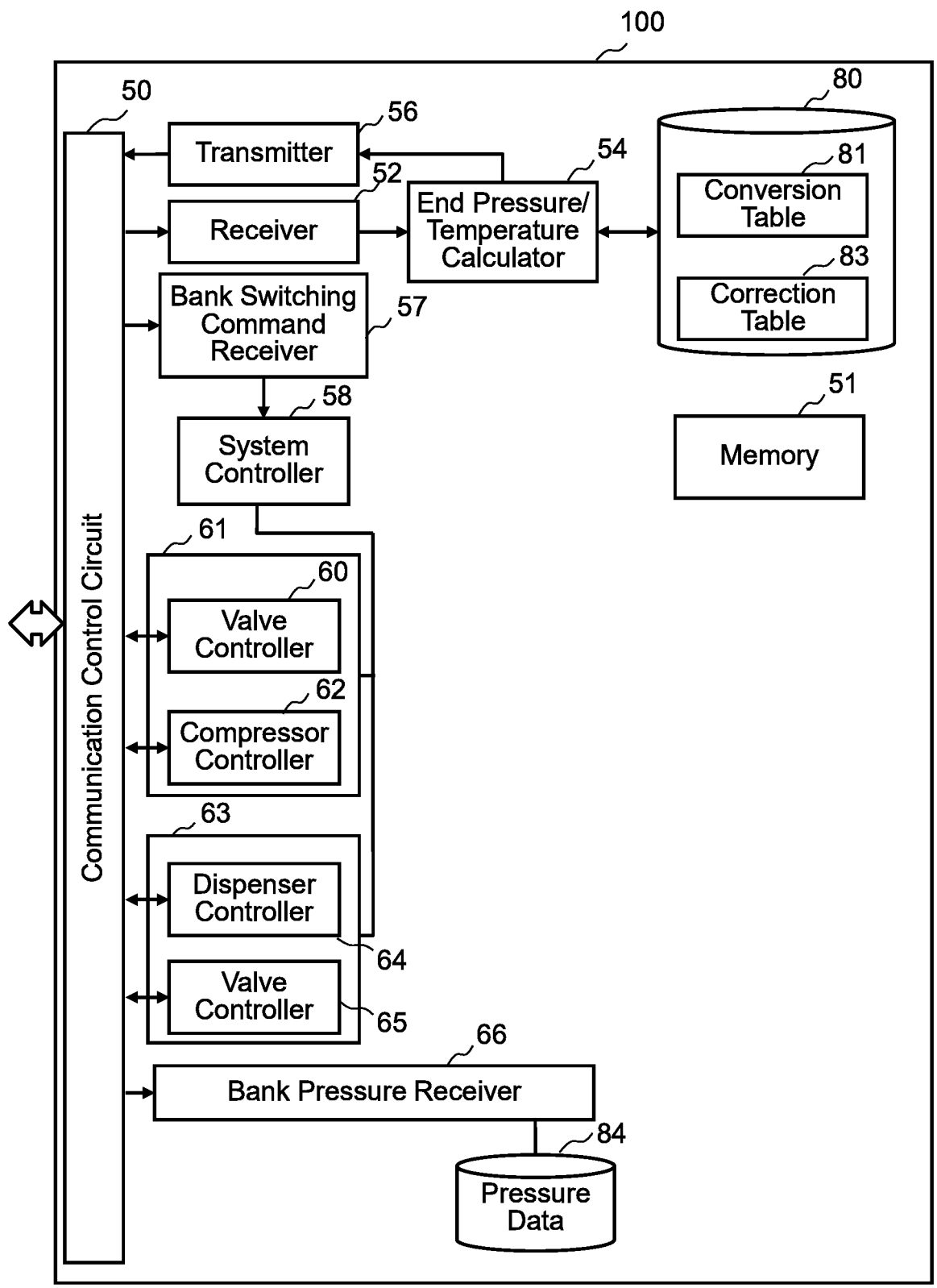
FIG. 3 is a configuration diagram illustrating an example of an internal configuration of a control circuit that controls the entire hydrogen fuel supply system according to the first embodiment.

FIG. 3 is a configuration diagram illustrating an example of the internal configuration of a control circuit that controls the entire hydrogen fuel supply system according to the first embodiment. In FIG. 3, in the control circuit 100, a communication control circuit 50, a memory 51, a receiver 52, an end pressure/temperature calculator 54, a transmitter 56, a bank switching command receiver 57, a system controller 58, and a pressure recovery controller 61, a supply controller 63, a bank pressure receiver 66, and storage devices 80 and 84 such as magnetic disk devices are provided. The pressure recovery controller 61 includes a valve controller 60 and a compressor controller 62. The supply controller 63 includes a dispenser controller 64 and a valve controller 65. Each of the components such as the receiver 52, the end pressure/temperature calculator 54, the transmitter 56, the bank switching command receiver 57, the system controller 58, the pressure recovery controller 61 (the valve controller 60, the compressor controller 62), the supply controller 63 (the dispenser controller 64, the valve controller 65), and the bank pressure receiver 66 includes a processing circuit, and the processing circuit includes an electric circuit, a computer, a processor, a circuit board, a semiconductor device or the like. Moreover, the components may use a common processing circuit (the same processing circuit). Alternatively, the components may use different processing circuits (separate processing circuits). Input data required and the result of calculation in the receiver 52, the end pressure/ temperature calculator 54, the transmitter 56, the bank switching command receiver 57, the system controller 58, the pressure recovery controller 61 (the valve controller 60, the compressor controller 62), the supply controller 63 (the dispenser controller 64, the valve controller 65), and the bank pressure receiver 66 are stored in the memory 51 each time.

In the storage device 80, a conversion table 81 indicating correlation between FCV information and the filling information corresponding to the FCV information is stored. The FCV information includes the pressure and temperature of the fuel tank 202 mounted on the FCV 200, and the volume of the fuel tank 202, and the filling information includes the remaining amount of hydrogen fuel, the final pressure, and the final temperature to be reached in the fuel tank 202. Furthermore, in the storage device 80, a correction table 83 for correcting the result obtained from the conversion table 81 is stored.

Here, with hydrogen fuel supplied from the multi-stage pressure accumulator 101, the FCV 200 is filled while the flow rate of the hydrogen fuel is adjusted by a dispenser. Therefore, a flow rate adjusting valve has been provided in a conventional dispenser housing. As described above, unlike an ON/OFF valve, such a flow rate adjusting valve is often used at an intermediate opening for adjusting the flow rate of the hydrogen fuel gas. Therefore, leakage from the shaft seal portion occurs due to deterioration over time. Use or development of a highly accurate flow rate adjusting valve that does not easily cause such a leakage is costly. Therefore, inexpensive and safe hydrogen fuel filling is demanded. Therefore, in the first embodiment, in place of a flow rate adjusting valve, a plurality of flow passages A and B is arranged in parallel, and the flow rate of the supplied hydrogen fuel per unit time is adjusted by switching between the flow passages A and B. Hereinafter, when the term "flow rate" is used, it means the flow rate per unit time even if "per unit time" is not stated.

Figure 4:
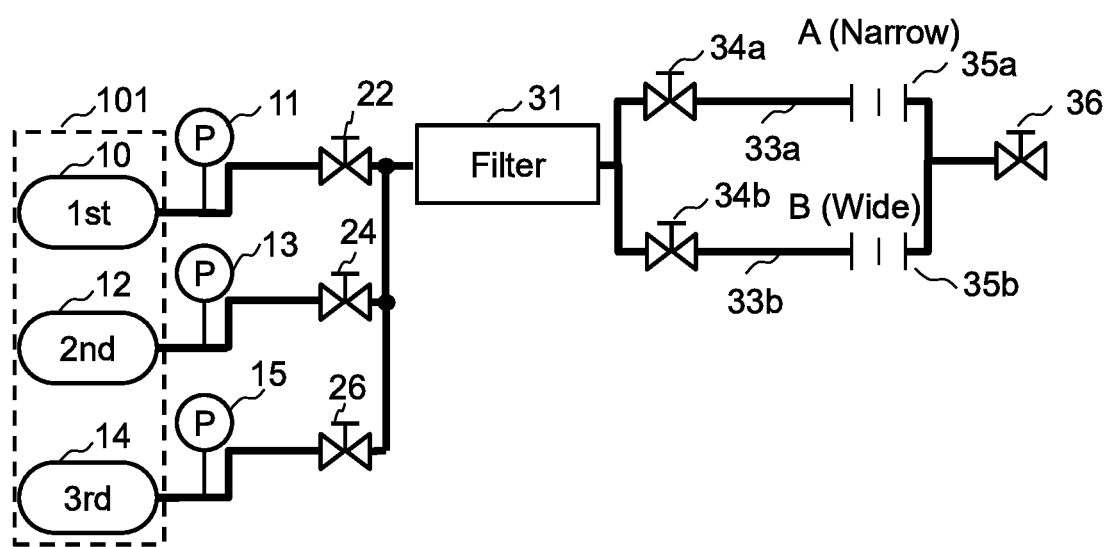
FIG. 4 is a diagram illustrating an example of a configuration of parallel flow passages according to the first embodiment.

FIG. 4 is a diagram illustrating an example of a configuration of parallel flow passages according to the first embodiment. FIG. 4 illustrates a part of the configuration of FIG. 1. In the example of FIG. 4, the parallel flow passages are configured to allow hydrogen fuel sequentially supplied from the pressure accumulators 10, 12, and 14 of the multi-stage pressure accumulator 101 to pass through the two flow passages A and B arranged in parallel through the filter 31. In the flow passage A, an orifice 35a is provided in the middle of the flow passage 33a. Furthermore, a valve 34a is provided in the middle of the flow passage 33a, and passage and blocking of the flow passage A are controlled by opening/closing the valve 34a. In the flow passage B, an orifice 35b is provided in the middle of the flow passage 33b. Furthermore, a valve 34b is provided in the middle of the flow passage 33b, and passage and blocking of the flow passage B are controlled by opening/closing the valve 34b. Through the flow passage A (first flow passage), as illustrated in FIG. 4, hydrogen fuel supplied from each of the pressure accumulator 10, 12, and 14 by switching between the plurality of pressure accumulators 10, 12, and 14, which accumulate hydrogen fuel under pressure, passes. As illustrated in FIG. 4, the flow passage B (second flow passage) is arranged in parallel with the flow passage A, and through the flow passage B, hydrogen fuel supplied from each of the pressure accumulators 10, 12, and 14 by switching passes. The valves 34a and 34b correspond to a switching valve that selectively switches between the flow passages from one of the two flow passages A and B to the other. The valve controller 90 in the control circuit 43 controls opening/closing of the switching valve. The valves 34a and 34b are not controlled to be at an intermediate opening but are controlled to be in either of two states, that is, one of full open/full closed state (ON/OFF). The diameters and lengths of the pipes forming the flow passages 33a and, 33b are set to sizes that allow hydrogen fuel to flow sufficiently due to the differential pressure between each of the pressure accumulators 10, 12, and 14 and the fuel tank 202 of the FCV 200. The flow passages 33a and 33b are set to have the same pipe diameter and length, for example. In the example of FIG. 4, the flowability (conductance) of the two flow passages A and B is adjusted by the size of the passage holes of the orifices 35a and 35b. If the area of the passage hole of an orifice is small (the opening area is small), the flowability can be decreased. Conversely, if the area of the passage hole of an orifice is large (the opening area is large), the flowability can be increased. In the hydrogen station 102, when the FCV 200 is filled with hydrogen fuel, the flow rate (filling speed) per unit time is limited. The orifice 35a is sized such that a desired flow rate is achieved in a state where the differential pressure between the pressure accumulators 10, 12, and 14 and the fuel tank 202 of the FCV 200 is large. The orifice 35b is sized such that a desired flow rate is achieved even when the differential pressure between the pressure accumulators 10, 12, and 14 and the fuel tank 202 of the FCV 200 is decreased to some extent. Specifically, in the flow passage B, an orifice having a larger opening size than one in the flow passage A is provided. Accordingly, in a state where the differential pressure between the pressure accumulators 10, 12, and 14 and the fuel tank 202 of the FCV 200 is large, the flow rate per unit time is made closer to a desired flow rate by causing the hydrogen fuel to pass through the flow passage A, and when the differential pressure becomes small, the flow passages are switched to the flow passage B provided with the orifice having a larger opening size to facilitate the flow of hydrogen fuel and suppress the decrease in the flow rate per unit time. The configuration of the parallel flow passages according to the first embodiment is not limited to this configuration.

Figure 5:
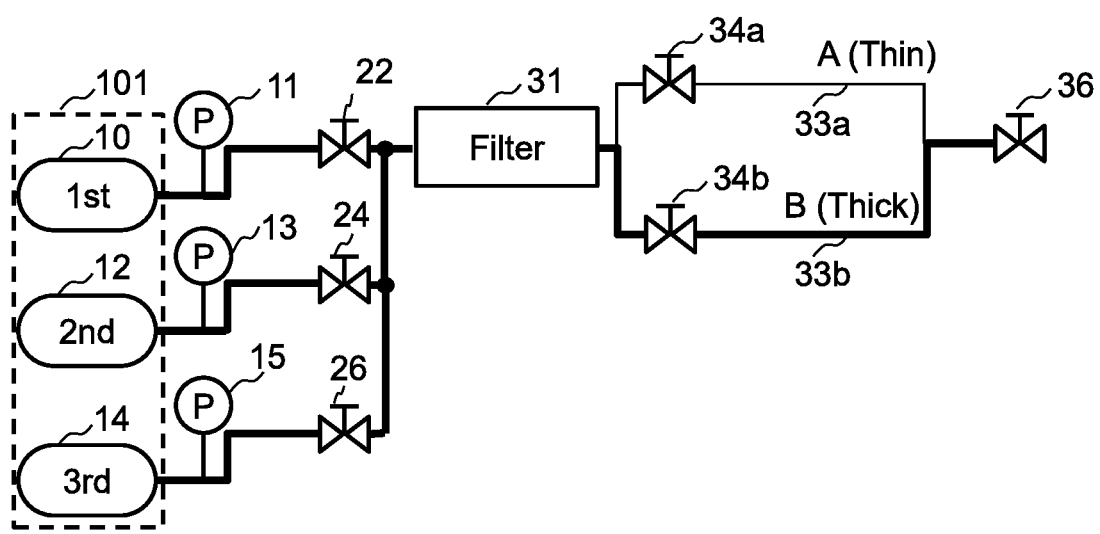
FIG. 5 is a diagram illustrating another example of the configuration of the parallel flow passages according to the first embodiment.

FIG. 5 is a diagram illustrating another example of the configuration of the parallel flow passages according to the first embodiment. In the example of FIG. 5, similarly to FIG. 4, the parallel flow passages are configured to allow the hydrogen fuel sequentially supplied from pressure accumulators 10, 12, and 14 of a multi-stage pressure accumulator 101 to pass through two flow passages A and B arranged in parallel through a filter 31. In the flow passage A, a valve 34a is provided in the middle of a flow passage 33a, and passage and blocking of the flow passage A are controlled by opening/closing the valve 34a. In the flow passage B, a valve 34b is provided in the middle of a flow passage 33b, and passage and blocking of the flow passage B are controlled by opening/closing the valve 34b. Through the flow passage A (first flow passage), as illustrated in FIG. 5, hydrogen fuel supplied from each of the pressure accumulators 10, 12, and 14 by switching between the plurality of pressure accumulators 10, 12, and 14, which accumulate hydrogen fuel under pressure, passes. As illustrated in FIG. 5, the flow passage B (second flow passage) is arranged in parallel with the flow passage A, and through the flow passage B, hydrogen fuel supplied from each of the pressure accumulators 10, 12, and 14 by switching passes. The valves 34a and 34b correspond to a switching valve that selectively switches between the flow passages from one of the two flow passages A and B to the other. The valve controller 90 in the control circuit 43 controls opening/closing of the switching valve. The valves 34a and 34b are not controlled to be at an intermediate opening but are controlled to be in either of two states, that is, one of full open/full closed state (ON/OFF). In the example of FIG. 5, the pipe diameters (or/and lengths) of the flow passages 33a and 33b are made different, and the flowability (conductance) of the two flow passages A and B is adjusted by the size difference. If the pipe diameter is small, the flowability can be decreased. On the contrary, if the pipe diameter is large, the flowability can be increased. Similarly, if the pipe length is long, the flowability can be decreased. If the pipe length is short, the flowability can be increased. The flow passage 33a is sized such that a desired flow rate is achieved in a state where the differential pressure between the pressure accumulators 10, 12, and 14 and the fuel tank 202 of the FCV 200 is large. The flow passage 33b is sized such that a desired flow rate is achieved even when the differential pressure between the pressure accumulators 10, 12, and 14 and the fuel tank 202 of the FCV 200 is decreased to some extent. Specifically, for example, a pipe having a larger diameter than one in the flow passage A is provided in the flow passage B. Accordingly, in a state where the differential pressure between the pressure accumulators 10, 12, and 14 and the fuel tank 202 of the FCV 200 is large, the flow rate per unit time is made close to a desired flow rate by passing through the flow passage A. When the pressure becomes small, the flow passages are switched to the flow passage B having a large pipe diameter to facilitate the flow of hydrogen fuel and suppress the decrease in the flow rate per unit time. The configuration of the parallel flow passages according to the first embodiment is not limited to this configuration.

Figure 6:
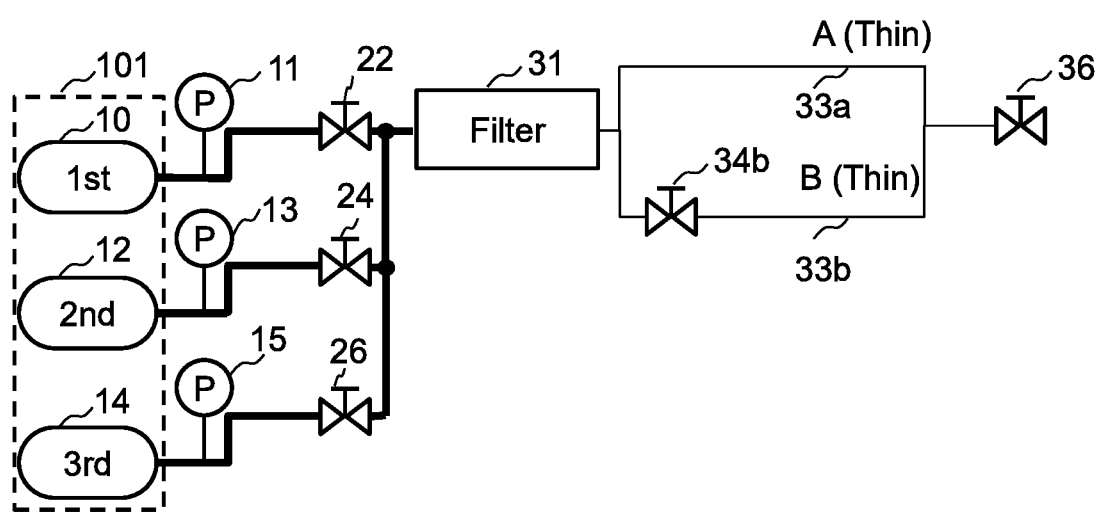
FIG. 6 is a diagram illustrating another example of the configuration of the parallel flow passages according to the first embodiment.

FIG. 6 is a diagram illustrating another example of the configuration of the parallel flow passages according to the first embodiment. In the example of FIG. 6, similarly to FIG. 5, the parallel flow passages are configured to allow the hydrogen fuel sequentially supplied from pressure accumulators 10, 12, and 14 of a multi-stage pressure accumulator 101 to pass through two flow passages A and B arranged in parallel through a filter 31. The flow passage A is formed from a flow passage 33a, and a valve 34a is not provided. Therefore, the flow passage A can be always passed through. In the flow passage B, a valve 34b is provided in the middle of a flow passage 33b, and passage and blocking of the flow passage B are controlled by opening/closing the valve 34b. Through the flow passage A (first flow passage), as illustrated in FIG. 6, hydrogen fuel supplied from each of the pressure accumulators 10, 12, and 14 by switching between the plurality of pressure accumulators 10, 12, and 14, which accumulate hydrogen fuel under pressure, passes. As illustrated in FIG. 6, the flow passage B (second flow passage) is arranged in parallel with the flow passage A, and through the flow passage B, hydrogen fuel supplied from each of the pressure accumulators 10, 12, and 14 by switching passes. The valve 34b corresponds to a switching valve that switches between one (flow passage A in this example) and both (flow passages A+B) of the two flow passages A and B. The valve controller 90 in the control circuit 43 controls opening/closing of the switching valve. The valve 34b is not controlled to be at an intermediate opening but are controlled to be in either of two states, that is, one of full open/full closed state (ON/OFF). In the example of FIG. 6, the flowability (conductance) is adjusted by the number of flow passages. The flow passage 33a is sized such that a desired flow rate is achieved in a state where the differential pressure between the pressure accumulators 10, 12, and 14 and the fuel tank 202 of the FCV 200 is large. The flow passage 33b is set to have the same size as the flow passage 33a. Accordingly, in a state where the differential pressure between the pressure accumulators 10, 12, and 14 and the fuel tank 202 of the FCV 200 is large, the flow rate per unit time is made close to a desired flow rate by passing hydrogen fuel through the flow passage A. When the differential pressure becomes small, the flow passages are switched to increase the number of flow passages from one flow passage, which is the flow passage A, to two flow passages further including the flow passage B to double the passage area and facilitate the flow of hydrogen fuel, and then suppress the decrease in the flow rate per unit time. The flow passage 33b is not limited to have the same size as the flow passage 33a but may have any size as long as a desired flow rate can be achieved by both of the flow passages A and B even when the differential pressure between the pressure accumulators 10, 12, and 14 and the fuel tank 202 of the FCV 200 is decreased to some extent. Therefore, the flow passage 33b may be larger or smaller than the flow passage 33a.

As described above, in the first embodiment, the FCV 200 is filled with hydrogen fuel while adjusting the flow rate per unit time by using the switchable parallel flow passages A and B instead of a flow rate adjusting valve.

Figure 7:
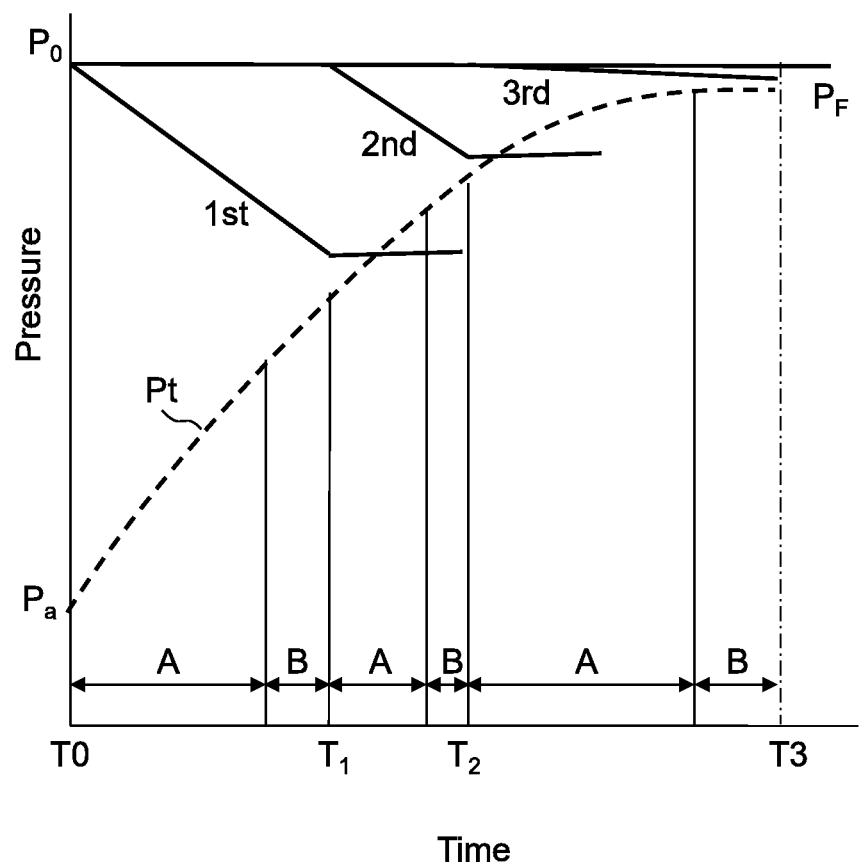
FIG. 7 is a diagram for describing a filling method when performing differential pressure filling with hydrogen fuel using a multi-stage pressure accumulator according to the first embodiment.

FIG. 7 is a diagram for describing a filling method when performing differential pressure filling with hydrogen fuel using the multi-stage pressure accumulator according to the first embodiment. In FIG. 7, the vertical axis represents pressure and the horizontal axis represents time. When the FCV 200 is filled with hydrogen fuel by a differential pressure, the pressure accumulators 10, 12, and 14 of the multi-stage pressure accumulator 101 typically accumulate the hydrogen fuel at the same pressure P0 (for example, 82 MPa) in advance. On the other hand, the fuel tank 202 of the FCV 200 that has come into the hydrogen station 102 is at a pressure Pa. A case where filling of the fuel tank 202 of the FCV 200 is started from this state will be described. The FCV 200 is filled with hydrogen fuel while, in particular, the dispenser 30 (hydrogen fuel filling system) adjusts the flow rate per unit time F of the hydrogen fuel by switching the flow passages in the dispenser 30 by the switching valve during supply of the hydrogen fuel from the pressure accumulator, to which switching has been made, every time when switching between the plurality of pressure accumulators 10, 12, and 14 is made. Here, description will be given using the configuration example of the parallel flow passages illustrated in FIG. 4 (and FIG. 1).

First, filling the fuel tank 202 is started from the pressure accumulator 10, which serves as the 1st bank. For the filling, the flow passage A is used in the dispenser 30. The hydrogen fuel accumulated under pressure in the pressure accumulator 10 moves toward the fuel tank 202 at a desired flow rate per unit time a1 (filling speed) due to the differential pressure between the pressure accumulator 10 and the fuel tank 202a, and the pressure in the fuel tank 202 increases gradually as illustrated by the dotted line Pt. Along with the increase, the pressure of the pressure accumulator 10 (graph indicated by "1st") gradually decreases. Then, the flow rate per unit time decreases as the differential pressure decreases, and when the flow rate becomes lower than a lower limit threshold Fra1 during the supply by the pressure accumulator 10, the flow passages in the dispenser 30 are switched from the flow passage A to the flow passage B. Then, the hydrogen fuel accumulated under pressure in the pressure accumulator 10 moves toward the fuel tank 202 at a desired flow rate per unit time b1 (filling speed) due to the differential pressure between the pressure accumulator 10 and the fuel tank 202, and the pressure in the fuel tank 202 further increases gradually as illustrated by the dotted line Pt. Then, the flow rate per unit time decreases as the differential pressure between the pressure accumulator 10 and the fuel tank 202 decreases, and when the flow rate becomes lower than a lower limit threshold Frb1, which is a time point where the time T1 has elapsed from the start of the filling, the pressure accumulators to be used are switched from the pressure accumulator 10 to the pressure accumulator 12, which serves as the 2nd bank. This switching increases the differential pressure between the pressure accumulator 12 and the fuel tank 202, so that the filling speed can be kept high. At the same time, flow passages in the dispenser 30 are switched from the flow passage B to the flow passage A to return the flow passage to the flow passage A.

Then, the hydrogen fuel accumulated under pressure in the pressure accumulator 12, which serves as the 2nd bank, moves toward the fuel tank 202 at a desired flow rate per unit time a2 (filling speed) due to the differential pressure between the pressure accumulator 12 and the fuel tank 202, and the pressure in the fuel tank 202 further increases gradually as illustrated by the dotted line Pt. Along with the increase, the pressure of the pressure accumulator 12 (graph indicated by "2nd") gradually decreases. Then, the flow rate per unit time decreases as the differential pressure decreases, and when the flow rate becomes lower than a lower limit threshold Fra2 during the supply by the pressure accumulator 12, the flow passages in in the dispenser 30 are switched from the flow passage A to the flow passage B. Then, the hydrogen fuel accumulated under pressure in the pressure accumulator 12 moves toward the fuel tank 202 at a desired flow rate b2 per unit time (filling speed) due to the differential pressure between the pressure accumulator 12 and the fuel tank 202, and the pressure in the fuel tank 202 further increases gradually as illustrated by the dotted line Pt. Then, the flow rate per unit time decreases as the differential pressure between the pressure accumulator 12 and the fuel tank 202 decreases, and when the flow rate becomes lower than a lower limit threshold Frb2, which is a time point where the time T2 has elapsed from the start of the filling, the pressure accumulators to be used are switched from the pressure accumulator 12 to the pressure accumulator 14, which serves as the 3rd bank. This switching increases the differential pressure between the pressure accumulator 14 and the fuel tank 202, so that the filling speed can be kept high. At the same time, flow passages in the dispenser 30 are switched from the flow passage B to the flow passage A to return the flow passage to the flow passage A.

Then, the hydrogen fuel accumulated under pressure in the pressure accumulator 14, which serves as the 3rd bank, moves toward the fuel tank 202 at a desired flow rate per unit time a3 (filling speed) due to the differential pressure between the pressure accumulator 14 and the fuel tank 202, and the pressure in the fuel tank 202 further increases gradually as illustrated by the dotted line Pt. Along with the increase, the pressure of the pressure accumulator 14 (graph indicated by "3rd") gradually decreases. Then, the flow rate per unit time decreases as the differential pressure decreases, and when the flow rate becomes lower than a lower limit threshold Fra3 during the supply by the pressure accumulator 14, the flow passages in the dispenser 30 are switched from the flow passage A to the flow passage B. Then, the hydrogen fuel accumulated under pressure in the pressure accumulator 12 moves toward the fuel tank 202 at a desired flow rate per unit time b3 (filling speed) due to the differential pressure between the pressure accumulator 14 and the fuel tank 202, and the pressure in the fuel tank 202 further increases gradually as illustrated by the dotted line Pt. Then, the fuel tank 202 is filled by the pressure accumulator 14, which serves as the 3rd bank, until the pressure of the fuel tank 202 reaches a final pressure PF (for example, 65 to 81 MPa) that is calculated as described below.

The desired flow rates per unit time a1 to a3 and b1 to b3 at the time of switching the flow passages for the respective banks may be the same or different. Since the conductance of each of the flow passages A and B is constant, the values of the flow rates per unit time change depending on the generated differential pressure. Typically, the values a1, b1, a2, b2, a3, and b3 are gradually smaller in this order.

Figure 8:
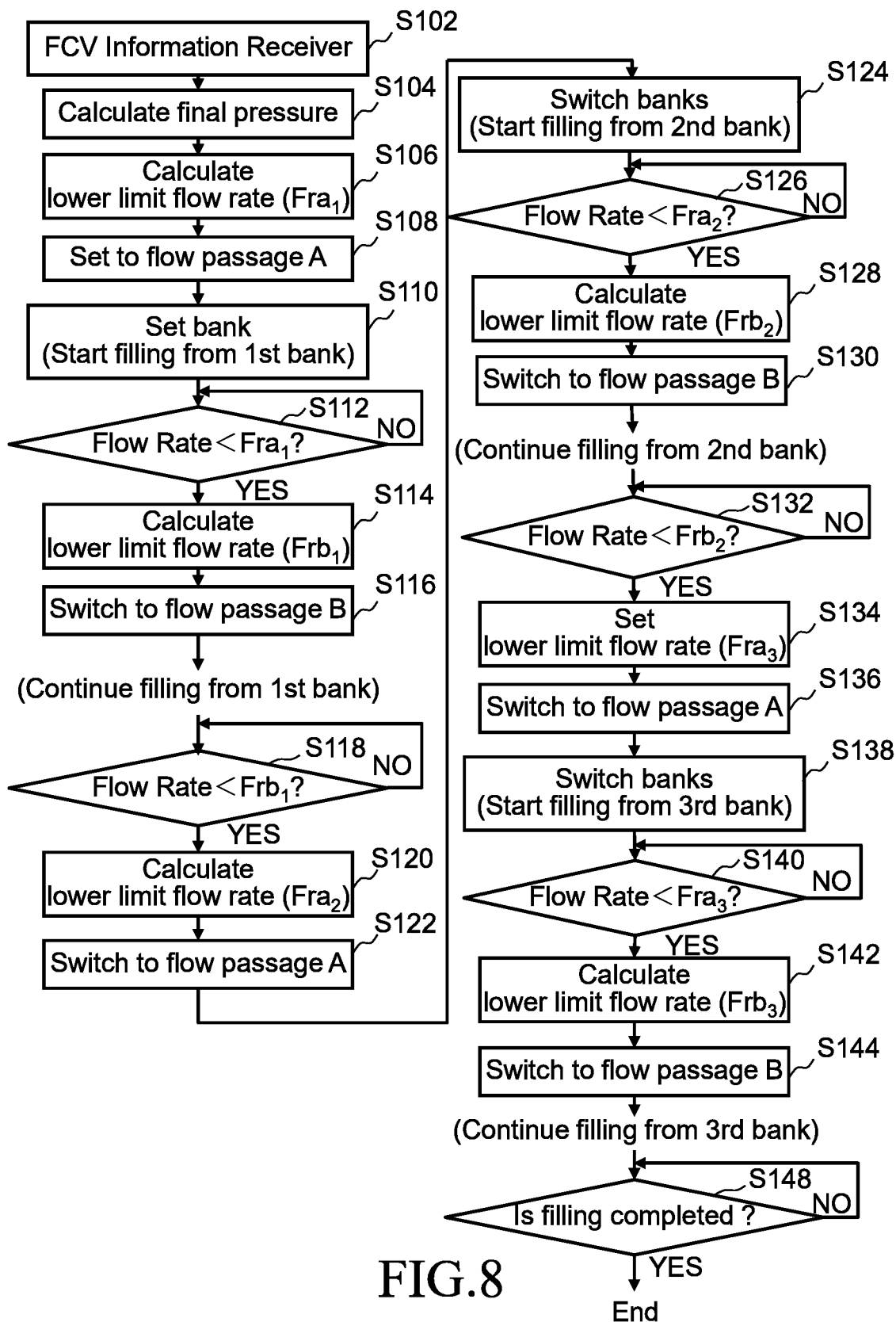
FIG. 8 is a flowchart illustrating main steps of a hydrogen fuel filling method according to the first embodiment.

FIG. 8 is a flowchart illustrating main steps of a hydrogen fuel filling method according to the first embodiment. In FIG. 8, the hydrogen fuel filling method according to the first embodiment performs a series of steps including an FCV information receiving step (S102), a final pressure calculating step (S104), a lower limit flow rate (lower limit threshold Fra1) calculating step (S106), and a flow passage A setting step (S108), a 1st bank setting step (S110), a flow rate determination step (S112), a lower limit flow rate (lower limit threshold Frb1) calculating step (S114), a flow passage B switching step (S116), a flow rate Determination step (S118), a lower limit flow rate (lower limit threshold Fra2) calculating step (S120), a flow passage A switching step (S122), a 2nd bank switching step (S124), a flow rate determination step (S126), a lower limit flow rate (Lower limit threshold Frb2) calculating step (S128), a flow passage B switching step (S130), a flow rate determination step (S132), a lower limit flow rate (lower limit threshold Fra3) calculating step (S134), a flow passage A switching step (S136), a 3rd bank switching step (S138), a flow rate determination step (S140), a lower limit flow rate (lower limit threshold Frb3) calculating step (S142), a flow passage B switching step (S144), and a filling completion determination step (S148).

Here, the flow rate per unit time (g/min) (filling speed) of the hydrogen fuel flowing through the flow passages A and B in the dispenser 30 changes depending on the conductance of the flow passages A and B, the pressures of the accumulators 10, 12, and 14 (banks), the pressure of the fuel tank 202 of the FCV 200, the outside air temperature, and the temperature of supplied hydrogen fuel. Therefore, for each of the flow passages A and B, and for each of the pressure accumulators 10, 12, and 14 (bank), a correlation table is created. The correlation table correlates the lower limit threshold of the flow rate per unit time (g/min) (filling speed) and the pressure of the fuel tank 202 of the FCV 200, the outside air temperature, and the temperature of supplied hydrogen fuel.

Figure 9:
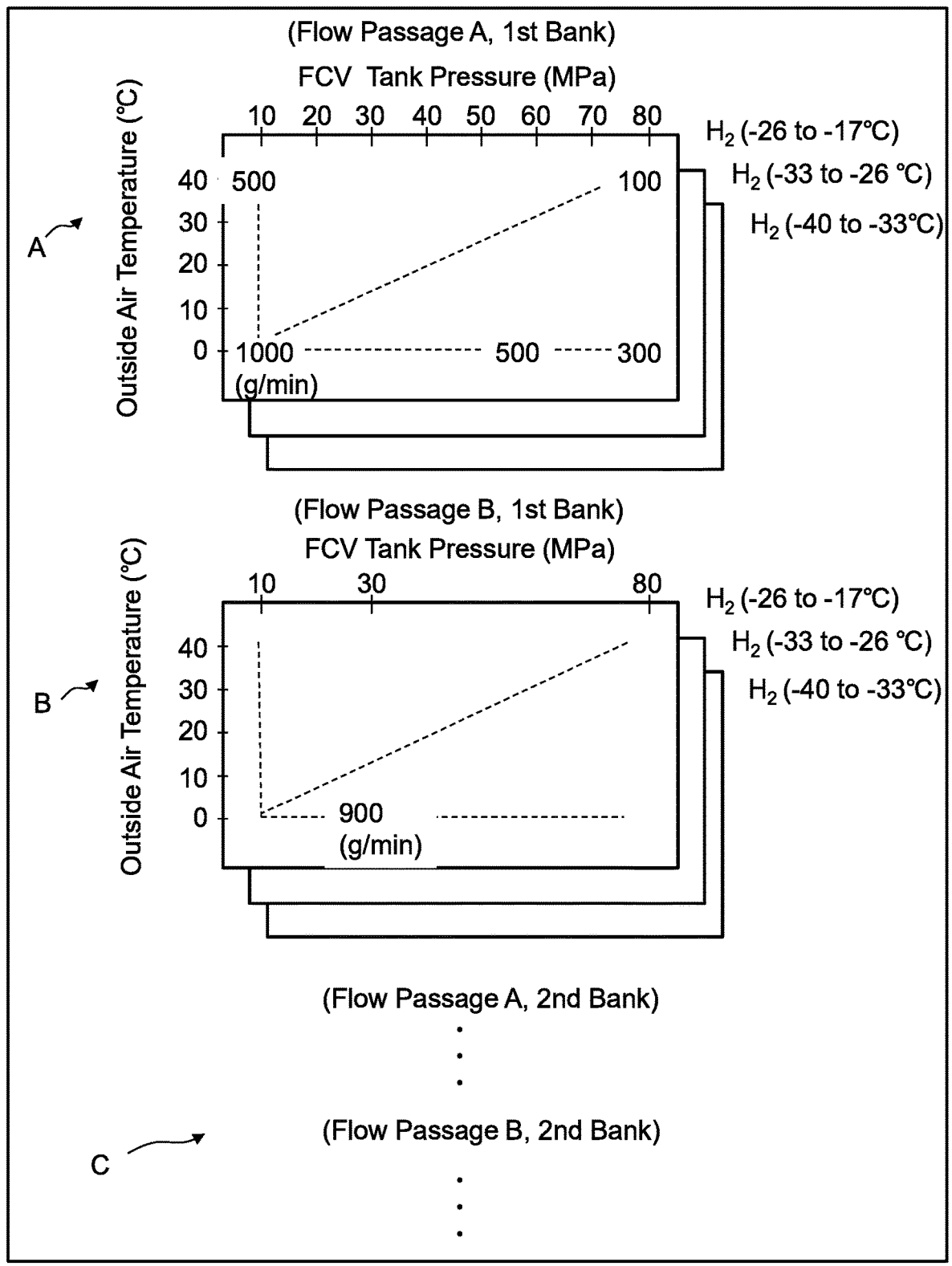
FIG. 9 is a diagram illustrating an example of correlation tables in the first embodiment.

FIG. 9 is a diagram illustrating an example of the correlation tables in the first embodiment. Part A of FIG. 9 illustrates an example of the correlation tables of the flow passage A when the 1st bank is used. Part B of FIG. 9 illustrates an example of the correlation tables of the flow passage B when the 1st bank is used. Furthermore, as illustrated in part C of FIG. 9, similarly, the correlation table of the flow passage A when the 2nd bank is used, the correlation table of the flow passage B when the 2nd bank is used, the correlation table of the flow passage A when the 3rd bank is used, and the correlation table of the flow passage B when the 3rd bank is used are created. Correlation tables are created for different ranges of the temperature of supplied hydrogen fuel. For example, three correlation tables may be preferably created for the temperature ranges of supplied hydrogen fuel of −26° C. to −17° C., −33° C. to −26° C., and −40° C. to −33° C. The temperature ranges of supplied hydrogen fuel are not limited to these. Correlation tables may be created for other temperature ranges. Alternatively, a correlation table may be created for each temperature of supplied hydrogen fuel although data amount becomes large.

In the example of part A of FIG. 9, the vertical axis of the correlation table defines the outside air temperature (° C.), and the horizontal axis defines the pressure (MPa) of the fuel tank 202 of the FCV 200, and in the area specified by the outside air temperature (° C.) and the pressure of the fuel tank 202 of the FCV 200 (MPa), the lower limit threshold Fra1 of the flow rate per unit time (g/min) (filling speed) of the flow passage A when the 1st bank is used is defined. In the example of part A of FIG. 9, in a case, for example, where the temperature of supplied hydrogen fuel is within the range of −26° C. to −17° C., the outside air temperature is 0° C., and the pressure of the fuel tank 202 of the FCV 200 is 10 MPa, the lower limit threshold Fra1 of the flow rate per unit time (filling speed) of the flow passage A when the 1st bank is used is defined as 1000 g/min. In a case, for example, where the temperature of the supplied hydrogen fuel is within the range of −26° C. to −17° C., the outside air temperature is 40° C., and the pressure of the fuel tank 202 of the FCV 200 is 10 MPa, the lower limit threshold Fra1 of the flow rate per unit time (filling speed) of the flow passage A when the 1st bank is used is defined as 500 g/min. In a case, for example, where the temperature of the supplied hydrogen fuel is within the range of −26° C. to −17° C., the outside air temperature is 0° C., and the pressure of the fuel tank 202 of the FCV 200 is 55 MPa, the lower limit threshold Fra1 of the flow rate per unit time (filling speed) of the flow passage A when the 1st bank is used is defined as 500 g/min. In a case, for example, where the temperature of the supplied hydrogen fuel is within the range of −26° C. to −17° C., the outside air temperature is 0° C., and the pressure of the fuel tank 202 of the FCV 200 is 80 MPa, the lower limit threshold Fra1 of the flow rate per unit time (filling speed) of the flow passage A when the 1st bank is used is defined as 300 g/min. In a case, for example, where the temperature of the supplied hydrogen fuel is within the range of −26° C. to −17° C., the outside air temperature is 40° C., and the pressure of the fuel tank 202 of the FCV 200 is 80 MPa, the lower limit threshold Fra1 of the flow rate per unit time (filling speed) of the flow passage A when the 1st bank is used is defined as 100 g/min. The higher the outside air temperature and/or the pressure in the fuel tank 202 is, the smaller value of the lower limit threshold Fra1 is set to. The same applies to other temperature ranges of supplied hydrogen fuel. In addition, in the example of part A of FIG. 9, a case where the pressure of the fuel tank 202 of the FCV 200 is lower than 10 MPa is not illustrated, but the lower limit threshold Fra1 may be defined for a pressure lower than 10 MPa.

In the example of part B of FIG. 9, the vertical axis of the correlation table defines the outside air temperature (° C.), and the horizontal axis defines the pressure (MPa) of the fuel tank 202 of the FCV 200, and in the area specified by the outside air temperature (° C.) and the pressure of the fuel tank 202 of the FCV 200 (MPa), the lower limit threshold Frb1 of the flow rate per unit time (g/min) (filling speed) of the flow passage B when the 1st bank is used is defined. When the 1st bank is used with the flow passage B, the flow passage A has already been used. Therefore, the residual pressure in the 1st bank (pressure accumulator 10) has been decreased and the pressure in the fuel tank 202 has been contrary increased. Considering this fact, the value is defined. In the example of part B of FIG. 9, in a case, for example, where the temperature of the supplied hydrogen fuel is within the range of −26° C. to −17° C., the outside air temperature is 0° C., and the pressure of the fuel tank 202 of the FCV 200 is 30 MPa, the lower limit threshold Frb1 of the flow rate per unit time (filling speed) of the flow passage B when the 1st bank is used is defined as 900 g/min. Similar to the example of part A of FIG. 9, the higher the outside air temperature and/or the pressure in the fuel tank 202 is, the smaller value of the lower limit threshold Frb1 is set to. The same applies to other temperature ranges of supplied hydrogen fuel. In addition, in the example of part B of FIG. 9, a case where the pressure of the fuel tank 202 of the FCV 200 is lower than 10 MPa is not illustrated, but the lower limit threshold Fra1 may be defined for a pressure lower than 10 MPa.

Values different from each other are set to the lower limit threshold Fra1 of the flow rate per unit time (filling speed) of the flow passage A when the 1st bank is used, the lower limit threshold Frb1 of flow rate per unit time (filling speed) of the flow passage B when the 1st bank is used, the lower limit threshold Fra2 of flow rate per unit time (filling speed) of the flow passage A when the 2nd bank is used, the lower limit threshold Frb2 of flow rate per unit time (filling speed) of the flow passage B when the 2nd bank is used, the lower limit threshold Fra3 of flow rate per unit time (filling speed) of the flow passage A when the 3rd bank is used, and the lower limit threshold Frb3 of flow rate per unit time (filling speed) of the flow passage B when the 3rd bank is used. Each value may be determined in advance through an experiment or the like.

Here, the pressure accumulators 10, 12, and 14 (banks) accumulate hydrogen fuel at the same pressure P0 (for example, 82 MPa) at the start of filling. In other words, when the flow passage A is used, all of the pressures of the pressure accumulators 10, 12, and 14 (banks) at the start of use are the same pressure P0 (for example, 82 MPa). Conversely, when the flow passage B (or the flow passages A+B) is used, the pressures of the accumulators 10, 12, and 14 (banks) at the start of use are the respective lower limit thresholds of the flow rate per unit time (g/min) (filling speed) of the flow passage A when the corresponding banks are used. Therefore, when the lower limit threshold of the flow passage B for each bank under the respective condition is determined, as the pressure of each pressure accumulator 10, 12, and 14 (each bank) at the start of use, the pressure after the use of the flow passage A is used.

As described above, the information of each correlation table created in advance is stored in the storage device 75. After each correlation table described above is created, filling of the FCV 200 with hydrogen fuel is accepted.

As the FCV information receiving step (S102), the FCV information receiver 71 receives FCV information about the fuel tank 202 (hydrogen storage vessel) mounted on the FCV 200 from the on-vehicle device 204 mounted on the FCV 200 (fuel cell vehicle (FCV)) that uses hydrogen fuel as a power source. Specifically, the following operation is performed. When the FCV 200 comes into the hydrogen station 102, and the nozzle 44 of the dispenser 30 is fixed to the receptacle of the fuel tank 202 of the FCV 200 by a user or an operator of the hydrogen station 102, communication between the on-vehicle device 204 and the communication control circuit 70 is established. Upon establishment of the communication, the on-vehicle device 204 outputs (transmits) FCV information including the current pressure and temperature of the fuel tank 202 and the volume of the fuel tank 202 in real time. The FCV information receiver 71 receives the FCV information via the communication control circuit 70. The received FCV information is then output to the threshold calculator 74 and stored in the storage device 75 in correlation with the reception time information. The received FCV information is also output by the FCV information relay 95 to the control circuit 100 via the communication control circuit 70. In the control circuit 100, the receiver 52 receives the FCV information via the communication control circuit 50. The FCV information is monitored constantly or at predetermined sampling intervals while the communication between the on-vehicle device 204 and the control circuit 43 (communication control circuit 70) is established. The received FCV information is stored in the storage device 80 together with the reception time information. The control circuit 100 also receives the outside air temperature measured by the thermometer 45. The outside air temperature may be received via the control circuit 43 or directly from the thermometer 45. Alternatively, the outside air temperature may be measured by another thermometer (not illustrated) in the control circuit 100.

Furthermore, upon establishment of the communication between the on-vehicle device 204 and the control circuit 43 (communication control circuit 70), the supply controller 63 controls the dispenser 30 and the valve (for example, the valve 22) to control the initial pressure and the supplied hydrogen temperature. Specifically, the dispenser controller 64 controls the valve controller 90 in the dispenser 30 such that the shutoff valves 36 and 38 are open only for a moment. The valve controller 65 opens the valve 22 only for a moment in synchronization with the operation of the shutoff valves 36 and 38. As a result, hydrogen fuel flows to the FCV 200 side only for a moment. At that time, the thermometer 43 measures the temperature of the supplied hydrogen fuel. In addition, a pressure gauge (not illustrated) measures the initial pressure of the supplied hydrogen fuel. The measured temperature of the supplied hydrogen fuel is received by the hydrogen temperature receiver 72. Further, the thermometer 45 measures the outside air temperature, and the measured outside air temperature is received by the outside air temperature receiver 73. The temperature of the supplied hydrogen fuel and the outside air temperature are monitored constantly or at predetermined sampling intervals while the communication between the on-vehicle device 204 and the control circuit 43 (communication control circuit 70) is established. The received temperature of the supplied hydrogen fuel and the outside air temperature are stored in the storage device 75 in correlation with the reception time information.

As the final pressure calculating step (S104), the end pressure/temperature calculator 54 reads the conversion table 81 from the storage device 80, and calculates and predicts the final pressure PF and the final temperature corresponding to the received pressure and temperature of the fuel tank 202 at the initial reception, the volume of the fuel tank 202, and the outside air temperature. In addition, the end pressure/temperature calculator 54 reads the correction table 83 from the storage device 80 and corrects the numerical value obtained referring to the conversion table 81. If an error is large in the result obtained only by using the data of the conversion table 81, the correction table 83 may be provided based on the result obtained by an experiment, a simulation, or the like. The calculated final pressure PF and final temperature are output by the transmitter 56 to the control circuit 43 in the dispenser 30 via the communication control circuit 50. In the control circuit 43 of the dispenser 30, the end pressure information receiver 93 receives the final pressure PF and final temperature information transmitted from the control circuit 100 via the communication control circuit 70.

As the lower limit flow rate (lower limit threshold Fra1) calculating step (S106), the control circuit 43 variably calculates and sets the lower limit threshold Fra1 with reference to the correlation table (table information) stored in the storage device 75. To the control circuit 43, specific information is input, and the control circuit 43 variably sets the lower limit threshold according to the value defined in the specific information. At least one of the pressure information of the fuel tank 202 mounted on the FCV 200, the hydrogen fuel temperature information, and the outside air temperature information is used as the specific information. For example, table information defining the pressure of the fuel tank 202 and the outside air temperature in association is used. In other words, to the control circuit 43, pressure information of the fuel tank 202 mounted on the FCV 200 is input, and the control circuit 43 variably sets the lower limit threshold according to the pressure value defined in the pressure information. In addition, to the control circuit 43, the temperature of the hydrogen fuel is input, and the control circuit 43 variably sets the lower limit threshold according to the temperature of the hydrogen fuel. Furthermore, to the control circuit 43, the outside air temperature is input, and the control circuit 43 variably sets the lower limit threshold according to the outside air temperature. Specifically, the threshold calculator 74 reads information of the temperature of the supplied hydrogen fuel and the outside air temperature, which is stored in the storage device 75, also reads the correlation table for the flow passage A and the 1st bank corresponding to the temperature of supplied hydrogen fuel, and calculates the lower limit threshold Fra1 corresponding to the current pressure of the fuel tank 202 and the outside air temperature defined in the FCV information. The calculated lower limit threshold Fra1 (threshold data) is temporarily stored in the storage device 76. In addition, the threshold setting unit 77 sets the lower limit threshold Fra1 stored in the storage device 76 as a determination threshold.

As the flow passage A setting step (S108), the valve controller 90 controls the valve 34a to open it and the valve 34b to close it, so that the flow passage A becomes a hydrogen fuel flow passage in the dispenser 30.

As the 1st bank setting step (S110), the supply unit 106 uses the dispenser 30 to fill the fuel tank 202 with hydrogen fuel from the pressure accumulator 10, which serves as the 1st bank of the multi-stage pressure accumulator 101 (start filling). The supply unit 106 includes, for example, the multi-stage pressure accumulator 101, the valves 22, 24, and 26, and the dispenser 30 related to the filling operation. Specifically, the supply unit 106 operates as follows. Under the control of the system controller 58, the supply controller 63 controls the supply unit 106 such that the supply unit 106 supplies hydrogen fuel from the pressure accumulator 10 to the fuel tank 202 of the FCV 200. Specifically, the system controller 58 controls the dispenser controller 64 and the valve controller 65. The dispenser controller 64 communicates with the control circuit 43 of the dispenser 30 via the communication control circuit 50 to control the operation of the dispenser 30. Specifically, the valve controller 90 opens the shutoff valves 36 and 38 in the dispenser 30. The valve controller 65 then outputs a control signal to the valves 22, 24, and 26 via the communication control circuit 50 to control opening/closing of each valve. Specifically, the valve controller 65 opens the valve 22 and keeps the valves 24 and 26 closed. Accordingly, hydrogen fuel is supplied from the pressure accumulator 10 to the fuel tank 202 through the flow passage A.

During the supply of the hydrogen fuel, the flowmeter 37 in the dispenser 30 measures the flow rate per unit time F (g/min) of the supplied hydrogen fuel constantly or at predetermined sampling intervals. The measured flow rate per unit time F is received by the flow rate receiver 78 via the communication control circuit 70. The received flow rate per unit time F is output to the determining unit 79.

As the flow rate determination step (S112), the determining unit 79 determines whether the received flow rate per unit time F becomes lower than the set lower limit threshold Fra1. When the flow rate per unit time F becomes lower than the lower limit threshold Fra1, the process proceeds to the next step. When the flow rate per unit time F is not lower than the lower limit threshold Fra1, the flow rate determination step (S112) is repeated until the flow rate per unit time F becomes lower than the lower limit threshold Fra1.

As the lower limit flow rate (lower limit threshold Frb1) calculating step (S114), the control circuit 43 variably calculates and sets the lower limit threshold Frb1 with reference to the correlation table (table information) stored in the storage device 75. Specifically, the threshold calculator 74 reads information of the latest temperature of the supplied hydrogen fuel and the outside air temperature, which is stored in the storage device 75, also reads the correlation table for the flow passage B and the 1st bank corresponding to the temperature of supplied hydrogen fuel, and calculates the lower limit threshold Frb1 corresponding to the current pressure of the fuel tank 202 and the latest outside air temperature defined in the FCV information. The calculated lower limit threshold Frb1 (threshold data) is temporarily stored in the storage device 76. In addition, the threshold setting unit 77 sets (updates) the lower limit threshold Frb1 stored in the storage device 76 as a determination threshold.

As the flow passage B switching step (S116), the control circuit 43 switches the flow passages by the switching valve when the measured flow rate F becomes lower than the lower limit threshold Fra1. In the example of FIGS. 4 and 5, the two valves 34a and 34b correspond to the switching valve. In the example of FIG. 6, the valve 34b corresponds to the switching valve. Specifically, the valve controller 90 controls the valve 34a to close it and the valve 34b to open it, so that hydrogen fuel flow passages in the dispenser 30 are switched from the flow passage A (is set) to the flow passage B. Accordingly, hydrogen fuel is supplied from the pressure accumulator 10 to the fuel tank 202 through the flow passage B. In other words, hydrogen filling of the fuel tank 202 from the pressure accumulator 10 is continued.

As described above, the FCV 200 is filled with hydrogen fuel while the flow passages are switched by the switching valves (valves 34a and 34b) during the supply from the pressure accumulator 10. The FCV 200 is filled with hydrogen fuel while adjusting the flow rate per unit time F of the hydrogen fuel by switching the flow passages.

As the flow rate determination step (S118), the determining unit 79 determines whether the received flow rate per unit time F becomes lower than the set lower limit threshold Frb1. When the flow rate per unit time F becomes lower than the lower limit threshold Frb1, the process proceeds to the next step. When the flow rate per unit time F is not lower than the lower limit threshold Frb1, the flow rate determination step (S118) is repeated until the flow rate per unit time F becomes lower than the lower limit threshold Frb1.

As the lower limit flow rate (lower limit threshold Fra2) calculating step (S120), the control circuit 43 variably calculates and sets the lower limit threshold Fra2 with reference to the correlation table (table information) stored in the storage device 75. Specifically, the threshold calculator 74 reads information of the latest temperature of the supplied hydrogen fuel and the outside air temperature, which is stored in the storage device 75, also reads the correlation table for the flow passage A and the 2nd bank corresponding to the temperature of supplied hydrogen fuel, and calculates the lower limit threshold Fra2 corresponding to the current pressure of the fuel tank 202 and the latest outside air temperature defined in the FCV information. The calculated lower limit threshold Fra2 (threshold data) is temporarily stored in the storage device 76. In addition, the threshold setting unit 77 sets (updates) the lower limit threshold Fra2 stored in the storage device 76 as a determination threshold. In addition, the bank switching controller 91 transmits, via the communication control circuit 70, a bank switching command instructing bank switching to the 2nd bank to the control circuit 100.

As the flow passage A switching step (S122), the control circuit 43 controls switching of the flow passages by the switching valve when the measured flow rate F becomes lower than the lower limit threshold Frb1. In the examples of FIGS. 4 and 5, the two valves 34a and 34b correspond to the switching valve. In the example of FIG. 6, the valve 34b corresponds to the switching valve. Specifically, the valve controller 90 controls the valve 34a to open it and the valve 34b to close it, so that hydrogen fuel flow passages in the dispenser 30 are switched from the flow passage B (is set) to the flow passage A.

As the 2nd bank switching step (S124), the bank switching command receiver 57 receives a bank switching command from the dispenser 30 via the communication control circuit 50. Upon receiving the bank switching command, the supply unit 106 uses the dispenser 30 to fill the fuel tank 202 with hydrogen fuel from the pressure accumulator 12, which serves as the 2nd bank of the multi-stage pressure accumulator 101 (start filling). Specifically, the supply unit 106 operates as follows. To the system controller 58, the bank switching command is input, and the system controller 58 controls the supply controller 63. Under the control of the system controller 58, the supply controller 63 controls the supply unit 106 such that the supply unit 106 supplies hydrogen fuel from the pressure accumulator 12 to the fuel tank 202 of the FCV 200. Specifically, the system controller 58 controls the valve controller 65. The valve controller 65 outputs a control signal to the valves 22, 24, and 26 via the communication control circuit 50 to control opening/closing of each valve. Specifically, the valve controller 65 opens the valve 24 and closes the valves 22 and 26. Accordingly, hydrogen fuel is supplied from the pressure accumulator 12 to the fuel tank 202 through the flow passage A.

As the flow rate determination step (S126), the determining unit 79 determines whether the received flow rate per unit time F becomes lower than the set lower limit threshold Fra2. When the flow rate per unit time F becomes lower than the lower limit threshold Fra2, the process proceeds to the next step. When the flow rate per unit time F is not lower than the lower limit threshold Fra2, the flow rate determination step (S126) is repeated until the flow rate per unit time F becomes lower than the lower limit threshold Fra2.

As the lower limit flow rate (lower limit threshold Frb2) calculating step (S128), the control circuit 43 variably calculates and sets the lower limit threshold Frb2 with reference to the correlation table (table information) stored in the storage device 75. Specifically, the threshold calculator 74 reads information of the latest temperature of the supplied hydrogen fuel and the outside air temperature, which is stored in the storage device 75, also reads the correlation table for the flow passage B and the 2nd bank corresponding to the temperature of supplied hydrogen fuel, and calculates the lower limit threshold Frb2 corresponding to the current pressure of the fuel tank 202 and the latest outside air temperature defined in the FCV information. The calculated lower limit threshold Frb2 (threshold data) is temporarily stored in the storage device 76. In addition, the threshold setting unit 77 sets (updates) the lower limit threshold Frb2 stored in the storage device 76 as a determination threshold.

As the flow passage B switching step (S130), the control circuit 43 controls switching of the flow passages by the switching valve when the measured flow rate F becomes lower than the lower limit threshold Fra2. Specifically, the valve controller 90 controls the valve 34a to close it and the valve 34b to open it, so that hydrogen fuel flow passages in the dispenser 30 are switched from the flow passage A (is set) to the flow passage B. Accordingly, hydrogen fuel is supplied from the pressure accumulator 12 to the fuel tank 202 through the flow passage B. In other words, hydrogen filling of the fuel tank 202 from the pressure accumulator 12 is continued.

As the flow rate determination step (S132), the determining unit 79 determines whether the received flow rate per unit time F becomes lower than the set lower limit threshold Frb2. When the flow rate per unit time F becomes lower than the lower limit threshold Frb2, the process proceeds to the next step. When the flow rate per unit time F is not lower than the lower limit threshold Frb2, the flow rate determination step (S132) is repeated until the flow rate per unit time F becomes lower than the lower limit threshold Frb2.

As the lower limit flow rate (lower limit threshold Fra3) calculating step (S134), the control circuit 43 variably calculates and sets the lower limit threshold Fra3 with reference to the correlation table (table information) stored in the storage device 75. Specifically, the threshold calculator 74 reads information of the latest temperature of the supplied hydrogen fuel and the outside air temperature, which is stored in the storage device 75, also reads the correlation table for the flow passage A and the 3rd bank corresponding to the temperature of supplied hydrogen fuel, and calculates the lower limit threshold Fra3 corresponding to the current pressure of the fuel tank 202 and the latest outside air temperature defined in the FCV information. The calculated lower limit threshold Fra3 (threshold data) is temporarily stored in the storage device 76. In addition, the threshold setting unit 77 sets (updates) the lower limit threshold Fra3 stored in the storage device 76 as a determination threshold. In addition, the bank switching controller 91 transmits, via the communication control circuit 70, a bank switching command instructing bank switching to the 3rd bank to the control circuit 100.

As the flow passage A switching step (S136), the control circuit 43 controls switching of the flow passages by the switching valve when the measured flow rate F becomes lower than the lower limit threshold Frb2. Specifically, the valve controller 90 controls the valve 34a to open it and the valve 34b to close it, so that hydrogen fuel flow passages in the dispenser 30 are switched from the flow passage B (is set) to the flow passage A.

As the 3rd bank switching step (S138), the bank switching command receiver 57 receives a bank switching command from the dispenser 30 via the communication control circuit 50. Upon receiving the bank switching command, the supply unit 106 uses the dispenser 30 to fill the fuel tank 202 with hydrogen fuel from the pressure accumulator 14, which serves as the 3rd bank of the multi-stage pressure accumulator 101 (start filling). Specifically, the supply unit 106 operates as follows. To the system controller 58, the bank switching command is input, and the system controller 58 controls the supply controller 63. Under the control of the system controller 58, the supply controller 63 controls the supply unit 106 such that the supply unit 106 supplies hydrogen fuel from the pressure accumulator 14 to the fuel tank 202 of the FCV 200. Specifically, the system controller 58 controls the valve controller 65. The valve controller 65 outputs a control signal to the valves 22, 24, and 26 via the communication control circuit 50 to control opening/closing of each valve. Specifically, the valve controller 65 opens the valve 26 and closes the valves 22 and 24. Accordingly, hydrogen fuel is supplied from the pressure accumulator 14 to the fuel tank 202 through the flow passage A.

As the flow rate determination step (S140), the determining unit 79 determines whether the received flow rate per unit time F becomes lower than the set lower limit threshold Fra3. When the flow rate per unit time F becomes lower than the lower limit threshold Fra3, the process proceeds to the next step. When the flow rate per unit time F is not lower than the lower limit threshold Fra3, the flow rate determination step (S140) is repeated until the flow rate per unit time F becomes lower than the lower limit threshold Fra3.

As the lower limit flow rate (lower limit threshold Frb3) calculating step (S142), the control circuit 43 variably calculates and sets the lower limit threshold Frb3 with reference to the correlation table (table information) stored in the storage device 75. Specifically, the threshold calculator 74 reads information of the latest temperature of the supplied hydrogen fuel and the outside air temperature, which is stored in the storage device 75, also reads the correlation table for the flow passage B and the 3rd bank corresponding to the temperature of supplied hydrogen fuel, and calculates the lower limit threshold Frb3 corresponding to the current pressure of the fuel tank 202 and the latest outside air temperature defined in the FCV information. The calculated lower limit threshold Frb3 (threshold data) is temporarily stored in the storage device 76. In addition, the threshold setting unit 77 sets (updates) the lower limit threshold Frb3 stored in the storage device 76 as a determination threshold.

As the flow passage B switching step (S144), the control circuit 43 controls switching of the flow passages by the switching valve when the measured flow rate F becomes lower than the lower limit threshold Fra3. Specifically, the valve controller 90 controls the valve 34a to close it and the valve 34b to open it, so that hydrogen fuel flow passages in the dispenser 30 are switched from the flow passage A (is set) to the flow passage B. Accordingly, hydrogen fuel is supplied from the pressure accumulator 14 to the fuel tank 202 through the flow passage B. In other words, hydrogen filling of the fuel tank 202 from the pressure accumulator 14 is continued.

As the filling completion determination step (S148), the determining unit 94 determines whether the filling is completed. Specifically, the determining unit 94 determines whether the current pressure of the fuel tank 202 defined in the FCV information has reached the received final pressure PF. When the current pressure of the fuel tank 202 defined in the FCV information has not reached the received final pressure PF, the filling completion determination step (S148) is repeated until the final pressure PF is reached. The filling is finished when the current pressure of the fuel tank 202 defined in the FCV information has reached the received final pressure PF. Specifically, the valve controller 90 closes the shutoff valves 36 and 38 to block the flow passages. In addition, the valve controller 65 closes the valve 26.

Here, the FCV 200 that comes into the hydrogen station 102 is not limited to have the fuel tank 202 having a sufficiently low pressure. When the pressure of the fuel tank 202 is higher than, for example, a half of the pressure of the fuel tank 202 when it is full, for example, the two pressure accumulators 10 and 12 may be sufficient. When the pressure of the fuel tank 202 is higher, for example, the one pressure accumulator 10 may be sufficient. In any case, the pressure accumulators to be used are switched in the order of the pressure accumulators 10, 12, and 14. The pressure of the fuel tank 202 is monitored, as part of the FCV information, constantly or at predetermined sampling intervals while the communication between the on-vehicle device 204 and the control circuit 43 (communication control circuit 70) is established. The determining unit 94 then determines whether the current pressure of the fuel tank 202 defined in the FCV information has reached the final pressure PF. When the current pressure of the fuel tank 202 reaches the final pressure PF, the filling is finished.

As described above, the hydrogen fuel filling method according to the first embodiment includes a step of filling the FCV 200 that uses hydrogen fuel as the power source with hydrogen fuel supplied from the pressure accumulator, which accumulate hydrogen fuel under pressure, through the flow passage A, a step of switching the flow passages of the hydrogen fuel from the flow passage A to the flow passage B arranged in parallel with the flow passage A, or switching the flow passages of the hydrogen fuel from the flow passage A to both of the flow passages A and B during the supply from the pressure accumulator, and a step of filling the FCV 200 with hydrogen fuel from the pressure accumulator through the flow passage to which switching has been made.

Further, as described above, the hydrogen fuel filling method according to the first embodiment includes a step of, when the multi-stage pressure accumulator 101 is used, filling the FCV 200 with hydrogen fuel while adjusting the flow rate per unit time of the hydrogen fuel supplied from the pressure accumulator 10 out of the plurality of accumulators 10, 12, and 14, which accumulate the hydrogen fuel under pressure, by switching the flow passages of the hydrogen fuel supplied from the pressure accumulator 10 selectively from the flow passage A to the flow passage B arranged in parallel with the flow passage A or from the flow passage A to both of the flow passages A and B during the supply, and subsequently to the filling with hydrogen fuel supplied from the pressure accumulator 10, a step of filling the FCV 200 with hydrogen fuel supplied from the pressure accumulator 12 while adjusting the flow rate per unit time F of the hydrogen fuel supplied from the pressure accumulator 12 by switching the flow passages of the hydrogen fuel supplied from the pressure accumulator 12, to which switching has been made from the pressure accumulator 10, selectively from the flow passage A to the flow passage B arranged in parallel with the flow passage A, or from the flow passage A to both of the flow passages A and B during the supply. Similarly, subsequently to the filling of the FCV 200 with hydrogen fuel supplied from the pressure accumulator 12, a step of filling the FCV 200 with hydrogen fuel supplied from the pressure accumulator 14 is included.

By the processes described above, the filling (supply) the fuel tank 202 of the FCV 200 with hydrogen fuel is finished. The nozzle 44 of the dispenser 30 is disconnected from the receiving port (receptacle) of the fuel tank 202 of the FCV 200, and a user pays a fee, for example, corresponding to the supplied amount and leaves the hydrogen station 102.

On the other hand, such filling reduces the amount of hydrogen fuel and reduces the pressure in each pressure accumulator 10, 12, and 14. Therefore, the bank pressure receiver 66 receives the pressures in the pressure accumulators 10, 12, and 14 from the respective pressure gauges 11, 13, and 15 via the communication control circuit 50 constantly or at predetermined sampling periods, and stores the pressures in the storage device 80.

Since the pressure in each of the pressure accumulators 10, 12, and 14 is lowered due to the filling of the fuel tank 202 of the FCV 200, a pressure recovery mechanism 104 recovers the pressure in each of the pressure accumulators 10, 12, and 14. The compressor 40, the valves 21, 23, and 25, the valves 322, 324, 326, and 328, and the like are included in the pressure recovery mechanism 104. First, the system controller 58 selects a hydrogen fuel supply source connected to the suction side of the compressor 40 from the curdle 302, the intermediate pressure accumulator 304, the hydrogen trailer 306, or the hydrogen production apparatus 308. Then, under the control of the system controller 58, the pressure recovery controller 61 controls the pressure recovery mechanism 104 to recover the pressure of each of the pressure accumulators 10, 12, and 14. Specifically, first, the valve controller 60, controls one valve (valve 322, 324, 326, or 328) corresponding to a supply source of hydrogen fuel selected from the curdle 302, the intermediate pressure accumulator 304, the hydrogen trailer 306, or the hydrogen production apparatus 308 to change the state of the valve from an open state to a closed state under the control of the system controller 58. As a result, low-pressure hydrogen fuel is supplied to the suction side of the compressor 40.

The pressure of the pressure accumulator as each bank used for filling the fuel tank 202 of the FCV 200 may also be recovered during the filling. However, since there is not enough time to recover the pressure to the specified pressure, the pressure needs to be recovered after the filling. Since the banks are switched in the order of the 1st bank, the 2nd bank, and the 3rd bank, first, the pressure in the pressure accumulator 10, which serves as the 1st bank, is recovered. The valve controller 60 opens the valve 21 from the state where the valves 21, 23 and 25 are closed.

Then, the compressor controller 62 drives the compressor 40 to deliver low-pressure (for example, 0.6 MPa) hydrogen fuel while compressing it and fill the pressure accumulator 10 with hydrogen fuel until the pressure in the pressure accumulator 10 reaches a predetermined pressure P0 (for example, 82 MPa) so as to recover the pressure in the pressure accumulator 10.

Next, the valve controller 60 closes the valve 21 and opens the valve 23 instead.

Then, the compressor controller 62 drives the compressor 40 to deliver low-pressure (for example, 0.6 MPa) hydrogen fuel while compressing it and fill the pressure accumulator 12 with hydrogen fuel until the pressure in the pressure accumulator 12 reaches a predetermined pressure P0 (for example, 82 MPa) so as to recover the pressure in the pressure accumulator 12.

Next, the valve controller 60 closes the valve 23 and opens the valve 25 instead.

Then, the compressor controller 62 drives the compressor 40 to deliver low-pressure (for example, 0.6 MPa) hydrogen fuel while compressing it and fill the pressure accumulator 14 with hydrogen fuel until the pressure in the pressure accumulator 14 reaches a predetermined pressure P0 (for example, 82 MPa) so as to recover the pressure in the pressure accumulator 14.

By the processes described above, the hydrogen fuel can be similarly supplied when the next FCV 200 comes into the hydrogen station 102.

Here, in the above-described example, the case where the flow passages are switched using the lower limit thresholds of the flow rate F has been described, but other configurations may be possible.

Figure 10:
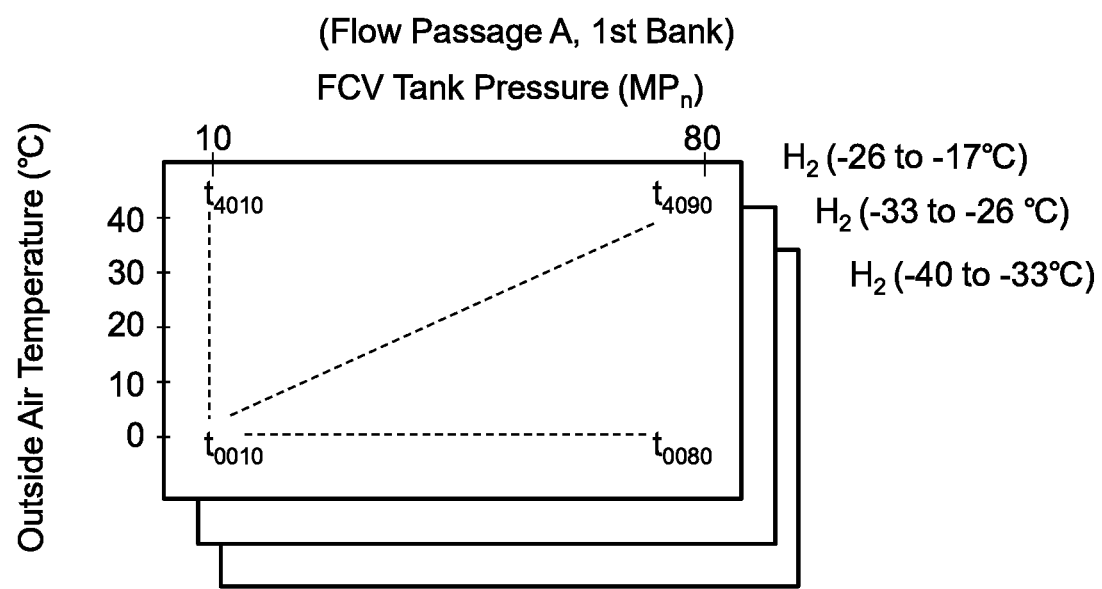
FIG. 10 is a diagram illustrating another example of correlation tables in first embodiment.

FIG. 10 is a diagram illustrating still another example of the correlation tables in the first embodiment. FIG. 10 illustrates an example of the correlation tables of the flow passage A when the 1st bank is used. Furthermore, the correlation table of the flow passage B when the 1st bank is used, the correlation table of the flow passage A when the 2nd bank is used, the correlation table of the flow passage B when the 2nd bank is used, the correlation table of the flow passage A when the 3rd bank is used, and the correlation table of the flow passage B when the 3rd bank is used are created for each range of the temperature of supplied hydrogen fuel. In each correlation table, instead of the lower limit threshold of the flow rate per unit time, an upper limit threshold t of hydrogen fuel supply time in one flow passage using one bank may be preferably defined. For each flow passage using each bank, the time from the start of supply to the time when the lower limit threshold of the flow rate per unit time (filling speed) is reached may be calculated, and the time may be defined as the upper limit threshold. Other than this point, the correlation tables are similar to those illustrated in part A of FIG. 9.

In the example of FIG. 10, the vertical axis of the correlation table defines the outside air temperature (° C.), and the horizontal axis defines the pressure (MPa) of the fuel tank 202 of the FCV 200, and in the area specified by the outside air temperature (° C.) and the pressure of the fuel tank 202 of the FCV 200 (MPa), the upper limit threshold of supply time t (sec) of the flow passage A when the 1st bank is used is defined. In the example of FIG. 10, in a case, for example, where the temperature of the supplied hydrogen fuel is within the range of −26° C. to −17° C., the outside air temperature is 0° C., and the pressure of the fuel tank 202 of the FCV 200 is 10 MPa, the upper limit threshold t0010 of the supply time of the flow passage A when the 1st bank is used is defined. In a case, for example, where the temperature of the supplied hydrogen fuel is within the range of −26° C. to −17° C., the outside air temperature is 40° C., and the pressure of the fuel tank 202 of the FCV 200 is 10 MPa, the upper limit threshold t4010 of the supply time of the flow passage A when the 1st bank is used is defined. In a case, for example, where the temperature of the supplied hydrogen fuel is within the range of −26° C. to −17° C., the outside air temperature is 0° C., and the pressure of the fuel tank 202 of the FCV 200 is 80 MPa, the upper limit threshold t0080 of the supply time of the flow passage A when the 1st bank is used is defined. In a case, for example, where the temperature of the supplied hydrogen fuel is within the range of −26° C. to −17° C., the outside air temperature is 40° C., and the pressure of the fuel tank 202 of the FCV 200 is 80 MPa, the upper limit threshold t4080 of the supply time of the flow passage A when the 1st bank is used is defined.

Then, the control circuit 43 controls switching of the flow passages by the switching valve when the time during which hydrogen fuel passes through one or both of the flow passages A and B reaches the upper limit threshold. To the control circuit 43, specific information is input, and the control circuit 43 variably sets the upper limit threshold according to the value defined in the specific information. As described above, at least one of the pressure information of the fuel tank 202 mounted on the FCV 200, the hydrogen fuel temperature information, and the outside air temperature information is used as the specific information. For example, table information defining the pressure of the fuel tank 202 and the outside air temperature in association is used.

A similar filling method can be implemented by replacing the above-mentioned lower limit flow rate with the upper limit time and replacing the lower limit threshold of the flow rate per unit time (filling speed) with the upper limit threshold of the supply time.

Note that, in the above-described example, the case where different correlation tables are created for banks from the 1st bank to the 3rd bank when the lower limit thresholds of the flow rate F illustrated in parts A to C of FIG. 9 are used has been described, but other configurations may be possible. As simpler correlation tables, a correlation table of the flow passage A common to banks and a correlation table of the flow passage B common to banks may be created for each temperature range of supplied hydrogen fuel. Furthermore, the case where a correlation table is created for each temperature range of supplied hydrogen fuel has been described, but other configurations may be possible. As even simpler correlation tables, a correlation table of the flow passage A and a correlation table of the flow passage B common to temperature ranges of hydrogen fuel and common to banks may be created.

Similarly, the case where different correlation tables are created for banks from the 1st bank to the 3rd bank when the upper limit thresholds of the supply time illustrated in FIG. 10 are used has been described, but other configurations may be possible. As simpler correlation tables, a correlation table of the flow passage A common to banks and a correlation table of the flow passage B common to banks may be created for each temperature range of supplied hydrogen fuel. Furthermore, the case where a correlation table is created for each temperature range of supplied hydrogen fuel has been described, but other configurations may be possible. As even simpler correlation tables, a correlation table of the flow passage A and a correlation table of the flow passage B common to temperature ranges of hydrogen fuel and common to banks may be created.

As described above, according to the first embodiment, filling with hydrogen fuel while adjusting the flow rate of the supplied hydrogen fuel is possible without using a flow rate adjusting valve by providing the switchable parallel flow passages. Therefore, inexpensive and safe hydrogen fuel filling becomes possible.

Second Embodiment

In the first embodiment, the case where the correlation tables defining the temperature of supplied hydrogen fuel, the outside air temperature, and the lower limit threshold of the flow rate corresponding to the pressure of the fuel tank 202 of the FCV 200 are used has been described, but other correlation tables may be possible. In a second embodiment, a case where a correlation table simpler than that in the first embodiment is used will be described. A configuration of a hydrogen fuel supply system of a hydrogen station according to the second embodiment is similar to that illustrated in FIG. 1. A flowchart illustrating main steps of a hydrogen fuel filling method according to the second embodiment is similar to that illustrated in FIG. 8. The second embodiment is similar to the first embodiment except for the description about the correlation table.

Figure 11:
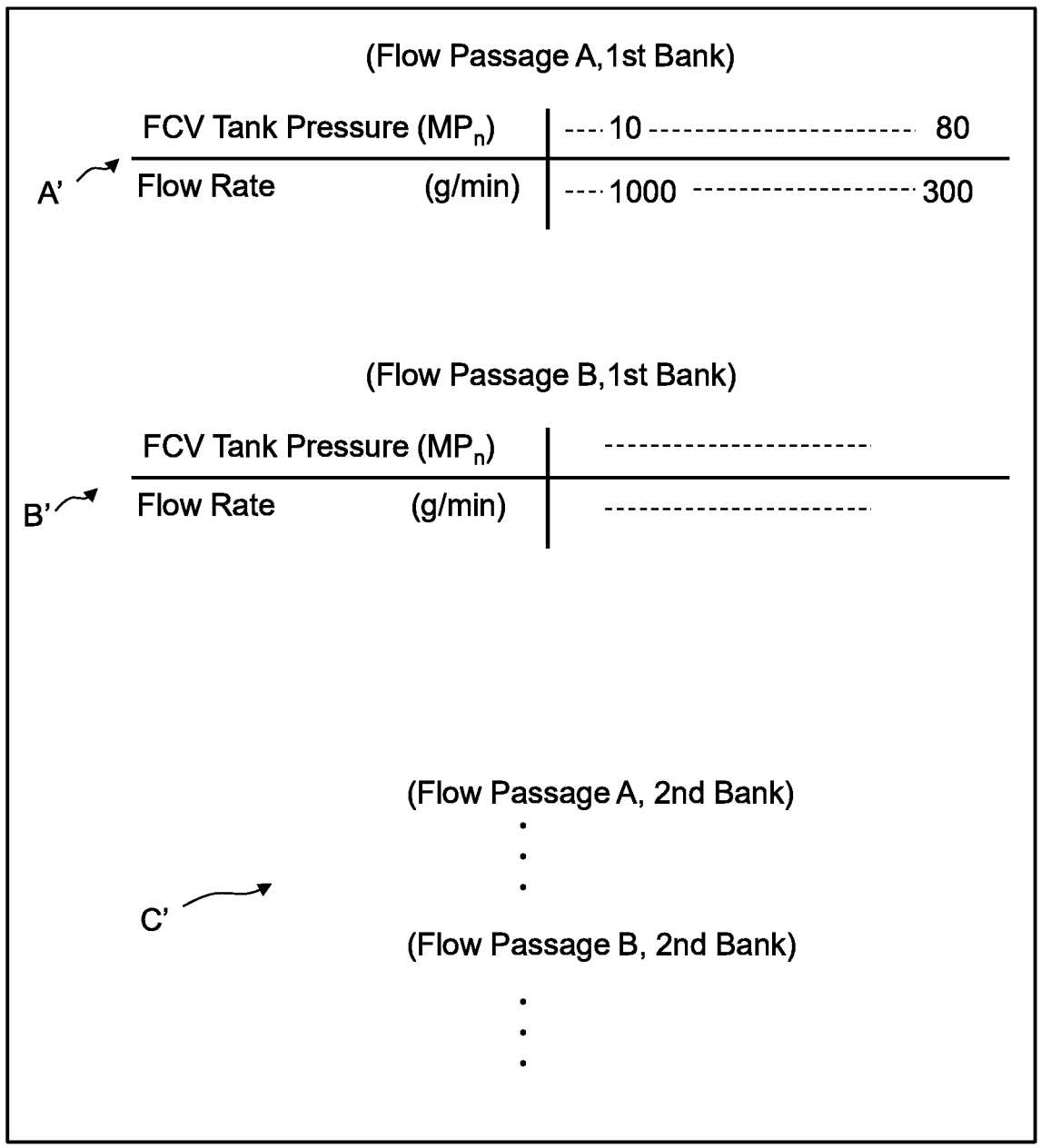
FIG. 11 is a diagram illustrating an example of correlation tables in a second embodiment.

FIG. 11 is a diagram illustrating an example of correlation tables in the second embodiment. Part A' of FIG. 11 illustrates an example of correlation tables of the flow passage A when the 1st bank is used. Part B' of FIG. 11 illustrates an example of correlation tables of the flow passage B when the 1st bank is used. Furthermore, as illustrated in part C' of FIG. 11, similarly, a correlation table of the flow passage A when the 2nd bank is used, a correlation table of the flow passage B when the 2nd bank is used, a correlation table of the flow passage A when the 3rd bank is used, and a correlation table of the flow passage B when the 3rd bank is used are created. Correlation tables are created for different ranges of the temperature of supplied hydrogen fuel. For example, three correlation tables may be preferably created for the temperature ranges of supplied hydrogen fuel of −26° C. to −17° C., −33° C. to −26° C., and −40° C. to −33° C. The temperature ranges of supplied hydrogen fuel are not limited to these. Correlation tables may be created for other temperature ranges. Alternatively, a correlation table may be created for each temperature of supplied hydrogen fuel although data amount becomes large.

In the example of part A' of FIG. 11, as a correlation table, the lower limit threshold Fra1 of the flow rate per unit time (g/min) (filling speed) of the flow passage A when the 1st bank is used corresponding to the pressure (MPa) of the fuel tank 202 of the FCV 200 is defined. In the example of part A' of FIG. 11, in a case, for example, where the temperature of supplied hydrogen fuel is within the range of −26° C. to −17° C. and the pressure of the fuel tank 202 of the FCV 200 is 10 MPa, the lower limit threshold Fra1 of the flow rate per unit time (filling speed) of the flow passage A when the 1st bank is used is defined as 1000 g/min. In a case, for example, where the temperature of supplied hydrogen fuel is within the range of −26° C. to −17° C. and the pressure of the fuel tank 202 of the FCV 200 is 80 MPa, the lower limit threshold Fra1 of the flow rate per unit time (filling speed) of the flow passage A when the 1st bank is used is defined as 300 g/min. The higher the pressure in the fuel tank 202 is, the smaller value of the lower limit threshold Fra1 is set to. The same applies to other temperature ranges of supplied hydrogen fuel.

In the example of part B' of FIG. 11, as a correlation table, the lower limit threshold Frb1 of the flow rate per unit time (g/min) (filling speed) of the flow passage B when the 1st bank is used corresponding to the pressure (MPa) of the fuel tank 202 of the FCV 200 is defined. When the 1st bank is used with the flow passage B, the flow passage A has already been used. Therefore, the residual pressure in the 1st bank (pressure accumulator 10) has been decreased and the pressure in the fuel tank 202 has been contrary increased. Similar to the example of part A' of FIG. 11, the higher the pressure in the fuel tank 202 is, the smaller value of the lower limit threshold Frb1 is set to. The same applies to other temperature ranges of supplied hydrogen fuel.

Values different from each other are set to the lower limit threshold Fra1 of the flow rate per unit time (filling speed) of the flow passage A when the 1st bank is used, the lower limit threshold Frb1 of flow rate per unit time (filling speed) of the flow passage B when the 1st bank is used, the lower limit threshold Fra2 of flow rate per unit time (filling speed) of the flow passage A when the 2nd bank is used, the lower limit threshold Frb2 of flow rate per unit time (filling speed) of the flow passage B when the 2nd bank is used, the lower limit threshold Fra3 of flow rate per unit time (filling speed) of the flow passage A when the 3rd bank is used, and the lower limit threshold Frb3 of flow rate per unit time (filling speed) of the flow passage B when the 3rd bank is used. Each value may be determined in advance through an experiment or the like.

Note that, also in the second embodiment, similar to the first embodiment, a case where different correlation tables are created for banks from the 1st bank to the 3rd bank when the lower limit threshold of the flow rate F is used has been described, but other configurations may be possible. As simpler correlation tables, a correlation table of the flow passage A common to banks and a correlation table of the flow passage B common to banks may be created for each temperature range of supplied hydrogen fuel. Furthermore, the case where a correlation table is created for each temperature range of supplied hydrogen fuel has been described, but other configurations may be possible. As even simpler correlation tables, a correlation table of the flow passage A and a correlation table of the flow passage B common to temperature ranges of hydrogen fuel and common to banks may be created.

In addition, similar to the case described with reference to FIG. 10, in each correlation table illustrated in parts A' to C' of FIG. 11, instead of the lower limit threshold of the flow rate per unit time, an upper limit threshold t of the hydrogen fuel supply time in one flow passage using one bank may be preferably defined. Furthermore, the case where different correlation tables are created for banks from the 1st bank to the 3rd bank when the upper limit thresholds of the supply time are used instead of the lower limit threshold of the flow rate per unit time has been described, but other configurations may be possible. As simpler correlation tables, a correlation table of the flow passage A common to banks and a correlation table of the flow passage B common to banks may be created for each temperature range of supplied hydrogen fuel. Furthermore, the case where a correlation table is created for each temperature range of supplied hydrogen fuel has been described, but other configurations may be possible. As even simpler correlation tables, a correlation table of the flow passage A and a correlation table of the flow passage B common to temperature ranges of hydrogen fuel and common to banks may be created.

Here, in each of the above-described embodiments, the case where at least the correlation tables defining the lower limit threshold of the flow rate (or the upper limit threshold of the supply time) corresponding to the pressure of the fuel tank 202 of the FCV 200 are used has been described, but other configurations may be possible. Regardless of other conditions, a constant lower limit threshold of the flow rate (or upper limit threshold of the supply time) may be set for the flow passage A and a constant lower flow rate threshold (or upper feed time threshold) may be set for the flow passage B.

The embodiments have been described with reference to the specific examples. However, the present invention is not limited to these specific examples. For example, in the above-described examples, the cases where determination is made based on only one of the lower limit threshold of the flow rate and the upper limit threshold of the supply time to switch the flow passages, but the present invention is not limited to this configuration. A case where the flow passages are switched when it is determined that both the lower limit threshold of the flow rate and the upper limit threshold of the supply time are satisfied is also preferable. Alternatively, a case where the flow passages are switched when it is determined that one of the lower limit threshold of the flow rate or the upper limit threshold of the supply time is satisfied is also preferable.

Further, in the above-described examples, the case where the multi-stage pressure accumulator 101 including the three pressure accumulators 10, 12, and 14 is used to fill one FCV with hydrogen fuel has been described, but the present invention is not limited to this configuration. Depending on the volumes and the like of the pressure accumulators 10, 12, and 14, more pressure accumulators may be used for filling one FCV. Alternatively, there may be a case where two pressure accumulators are enough for filing one FCV.

In the above-described examples, the case where one dispenser 30 is provided and the case where one nozzle 44 is provided for the one dispenser 30 have been described, but the present invention is not limited to this configuration. The number of dispensers 30 may be two or more. Similarly, the number of nozzles 44 provided for one dispenser 30 may be two or more.

In addition, although description has not been provided for parts of the device configuration, the control method, and the like that are not directly necessary for the description of the present invention, required device configuration and control method can be appropriately selected and used.

In addition, all hydrogen fuel filling systems and hydrogen fuel filling methods that include the elements of the present invention and can be achieved by appropriate modification by those skilled in the art fall in the scope of the present invention.

What is claimed is:

1. A hydrogen fuel filling system, comprising:
   a first flow passage through which hydrogen fuel supplied from a pressure accumulator that accumulates hydrogen fuel under pressure passes;
   a second flow passage through which hydrogen fuel supplied from the pressure accumulator passes, and which is arranged in parallel with the first flow passage;
   a switching valve comprising a pair of switching valves that switches flow passages selectively from one of the first and second flow passages to another, or that switches flow passages between one and both of the first and second flow passages, each of the pair of switching valves being connected to a respective one of the first and second flow passages, and wherein each of the pair of switching valves is configured to be positioned in either a fully-opened state or a fully-closed state; and
   a control circuit that controls opening/closing of the switching valve, wherein
   a fuel cell vehicle using hydrogen fuel as a power source is filled with hydrogen fuel while switching the flow passages by the switching valve during supply from the pressure accumulator, and
   in a state that a time during which hydrogen fuel passes through one or both of the first flow passage and the second flow passage reaches an upper time limit threshold, the control circuit controls switching of the flow passages by the switching valve.

2. The system according to claim 1 further comprising a flowmeter that measures a flow rate of the hydrogen fuel that is supplied.

3. The system according to claim 1, wherein the control circuit inputs specific information, and variably sets the upper time limit threshold according to a value defined in the specific information.

4. The system according to claim 3, wherein the specific information comprises pressure information of a hydrogen storage vessel mounted on the fuel cell vehicle.

5. The system according to claim 3, wherein table information defining pressure of the hydrogen storage vessel and outside air temperature in association is used as the specific information.

6. The system according to claim 3, wherein the specific information comprises temperature information of the hydrogen fuel.

7. The system according to claim 3, wherein the specific information comprises outside air temperature information.

* * * * *